United States Patent [19]

McCoy

[11] 4,266,242

[45] May 5, 1981

[54] TELEVISION SPECIAL EFFECTS ARRANGEMENT

[75] Inventor: Reginald F. H. McCoy, Gainesville, Fla.

[73] Assignee: Vital Industries, Inc., Gainesville, Fla.

[21] Appl. No.: 33,142

[22] Filed: Apr. 25, 1979

Related U.S. Application Data

[63] Continuation of Ser. No. 888,741, Mar. 21, 1978, abandoned.

[51] Int. Cl.³ .................. H04N 9/535; H04N 5/22
[52] U.S. Cl. .................................. 358/22; 358/183
[58] Field of Search ............... 358/22, 31, 180, 183, 358/182, 181, 11, 13, 127

[56] References Cited

U.S. PATENT DOCUMENTS

| | | | |
|---|---|---|---|
| 4,063,280 | 12/1977 | Hattori et al. | 358/22 |
| 4,134,128 | 1/1979 | Hurst | 358/22 |
| 4,152,719 | 5/1979 | Kellar | 358/22 |
| 4,163,248 | 7/1979 | Heitmann | 358/13 |
| 4,163,249 | 7/1979 | Michael et al. | 358/22 |
| 4,172,264 | 10/1979 | Taylor et al. | 358/22 |

FOREIGN PATENT DOCUMENTS

| | | |
|---|---|---|
| 1377144 | 12/1974 | United Kingdom . |
| 1388233 | 3/1975 | United Kingdom . |
| 1444411 | 7/1976 | United Kingdom . |
| 1520311 | 8/1978 | United Kingdom . |
| 1529337 | 10/1978 | United Kingdom . |

OTHER PUBLICATIONS

Broadcast Quality Digital Video Processing System, Panasonic Model, AV-7000.
"Digital Video Processing", *IBA Technical Review*, Issue No. 8, Sep. 1976, pp. 3-15 and 41-76.

*Primary Examiner*—John C. Martin
*Attorney, Agent, or Firm*—Mason, Kolehmainen, Rathburn & Wyss

[57] ABSTRACT

A television special effects system is provided wherein digitized picture elements of any one of a plurality of video input signals are assigned addresses corresponding to the desired location of each picture element in a composite output image. The digitized picture elements are then stored in a memory having a capacity equal to one full TV frame in accordance with the addresses assigned thereto.

Each video input may be positioned at any location in the composite output image by adding to or subtracting from the write addresses by means of horizontal or vertical positioning numbers. Each video input may also be compressed in either the horizontal or vertical direction, or both, by means of horizontal or vertical compression factors which control the write address generating means so that certain picture elements of the video input are not stored in memory. A process of interpolation is provided for the luminance component of the digitized picture elements so that the data values stored more closely approximate the values which the data would have at the points at which it is written.

A system of priorities is provided among the plurality of video input signals so that each desired input may be selected to occupy a portion of the composite output image to the exclusion of the others, even though they overlap.

The stored picture elements are read out of memory by means of a read address generator which is non-synchronous with respect to the plurality of video input signals so that the special effects system also acts as a frame store synchronizer for all of the video input signals. The read address generator may also be controlled by horizontal and vertical compression numbers so that a portion of the composite output image may be magnified to occupy the entire output screen.

96 Claims, 21 Drawing Figures

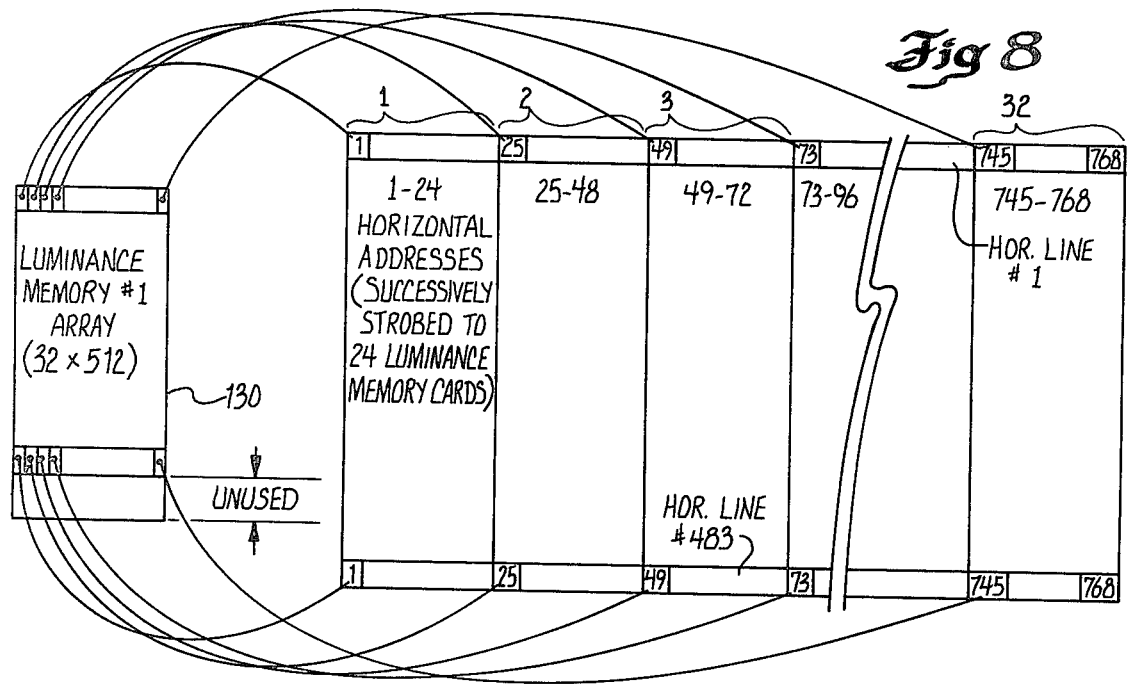
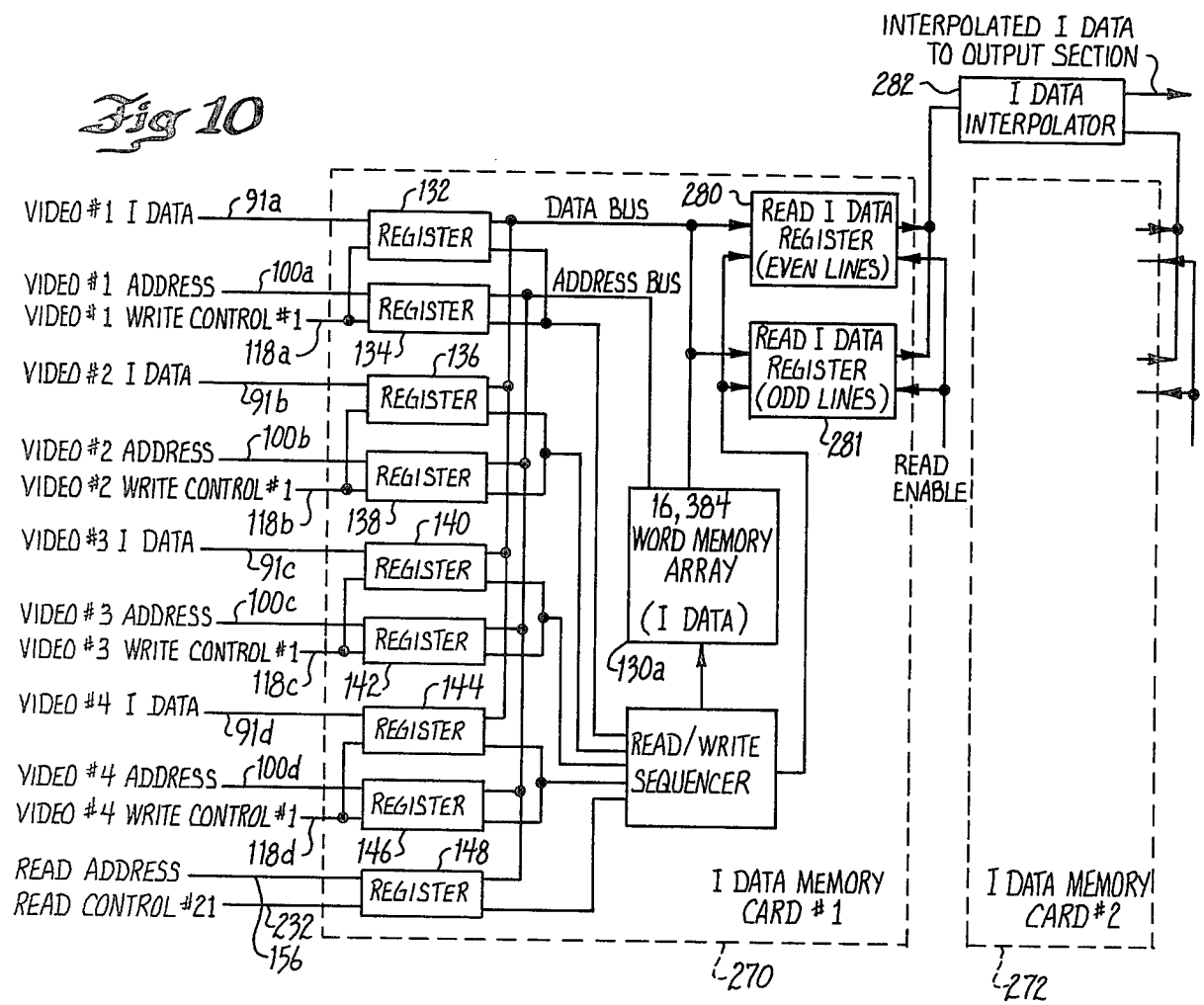

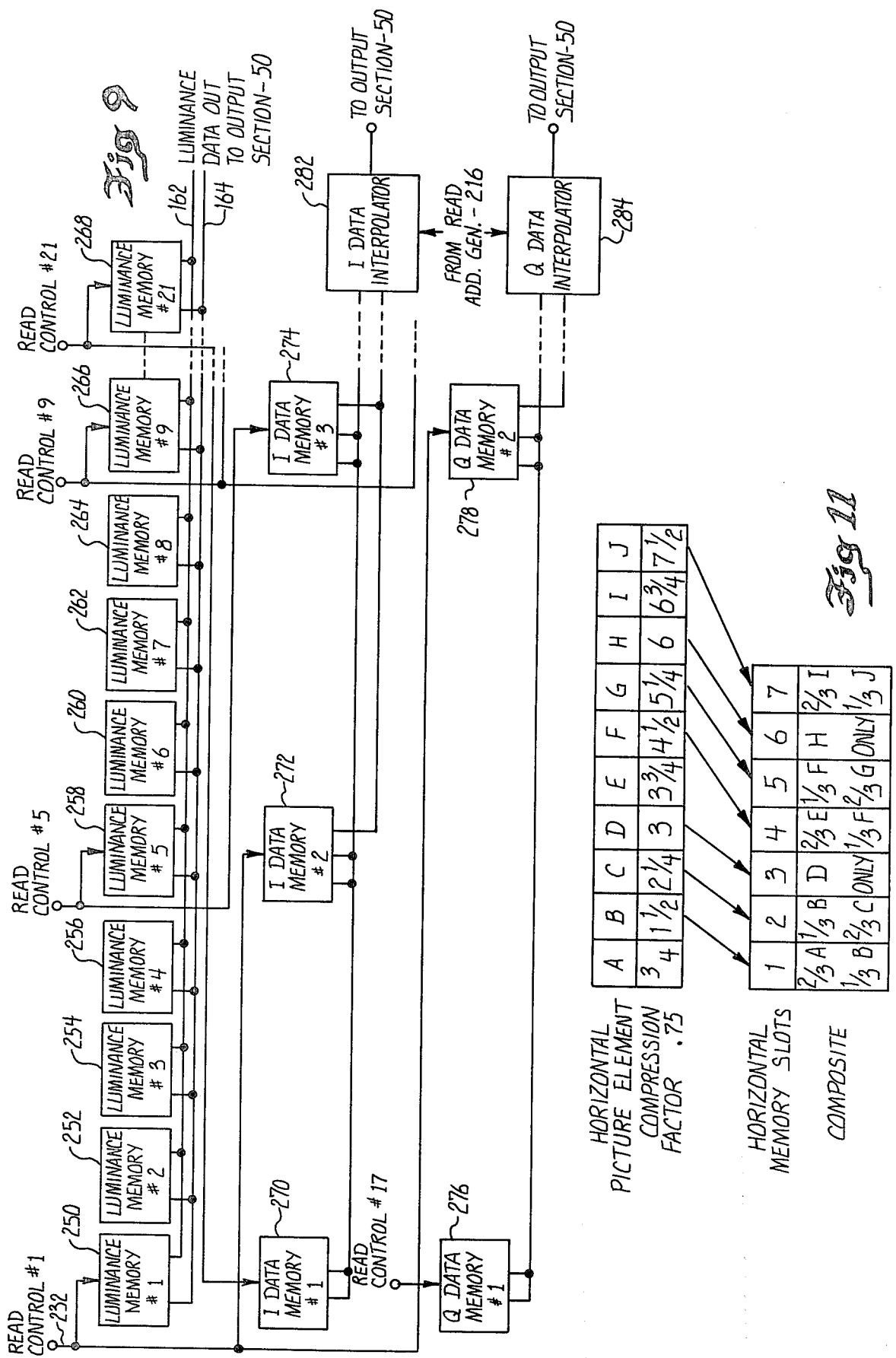

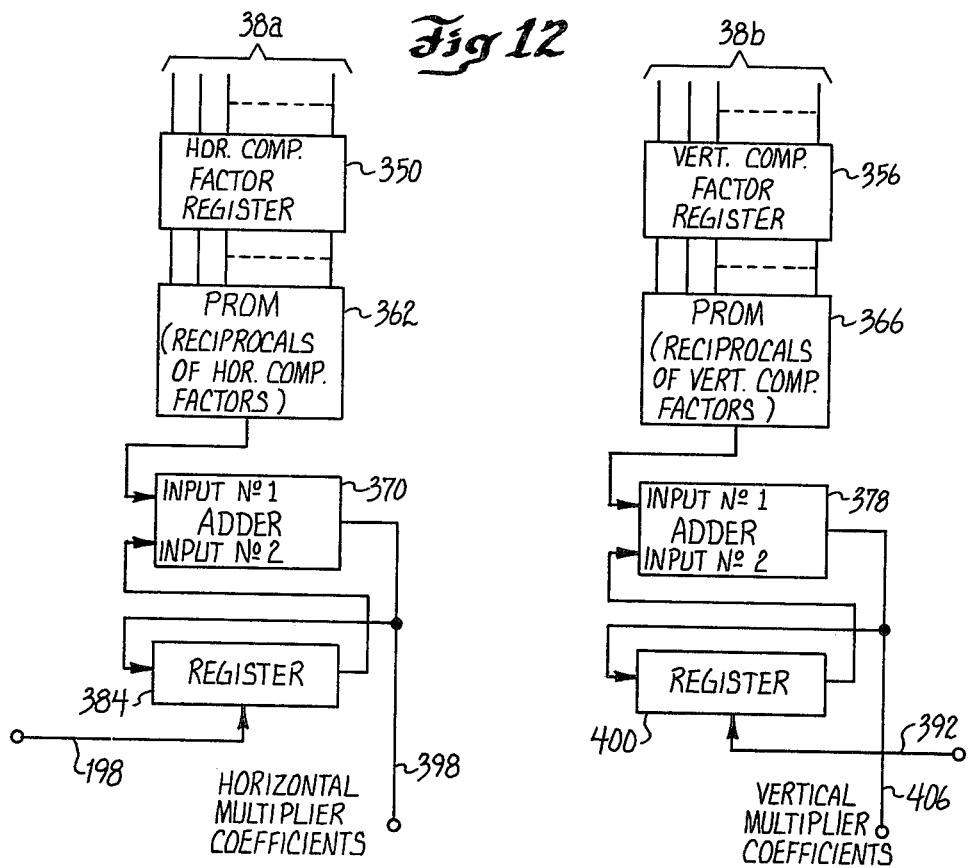

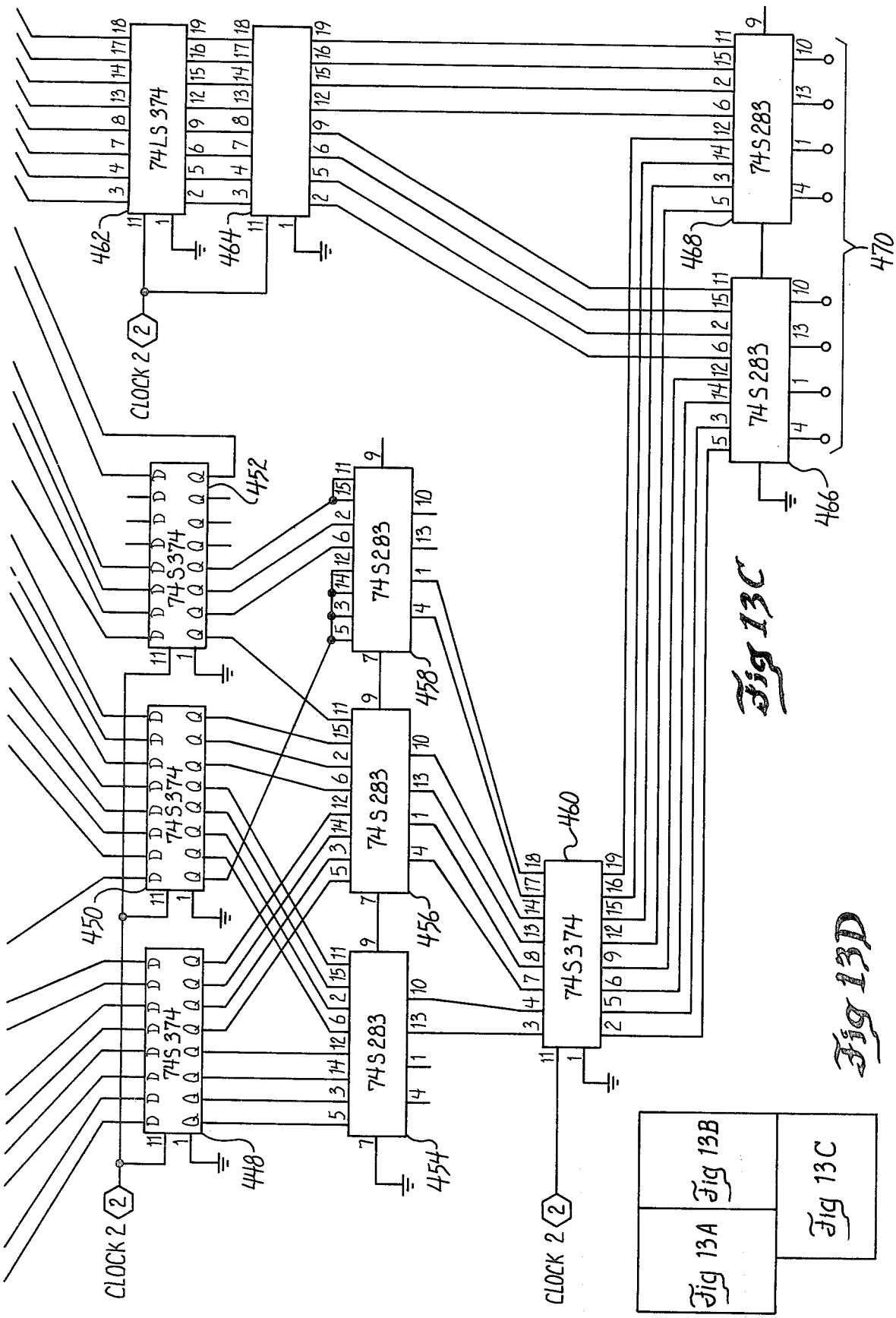

TELEVISION SPECIAL EFFECTS ARRANGEMENT

This is a continuation of application Ser. No. 888,741 filed Mar. 21, 1978, now abandoned.

The present invention relates to an arrangement for generating special effects suitable for use in television broadcasting, and more particularly, to an arrangement wherein a plurality of video input signals may be compressed and/or selectively positioned in a composite television output image.

Various arrangements have been heretofore proposed for obtaining special effects in television broadcasting. Most of these arrangements have employed systems wherein the first video signal is displayed in one portion of the output image bounded by an outline of some predetermined shape outside of which the other video input signal appears. In such arrangements neither the size nor the position of each of the video input signals is capable of variation, the boundary itself being the only variable. A digital special effects generator of this type is shown in U.S. Pat. No. 3,758,712. Other boundary type special effects generators are shown in U.S. Pat. Nos. 3,941,925; 3,944,731; 3,962,536; and 3,989,888. An analog type of special effects generator is also shown in U.S. Pat. No. 3,812,286.

In U.S. Pat. No. 4,011,401 a single image is stored in an array of light sensitive semiconductor devices each of which is individually addressable and digital control logic is employed to vary the manner in which the array of light sensitive devices is scanned so that portions of the single image may be repositioned or altered in various ways. However, when two video inputs are combined, conventional video switching circuits of the boundary type are employed, such as shown, for example, in U.S. Pat. No. 3,758,712.

Certain other prior art arrangements have been employed to provide a fixed compression or expansion of a single video signal. These arrangements have been employed in the digital video standards conversion field where it is desired to compress a 625 line picture (European standard) into a 525 line picture (U.S. standard), or to expand a 525 line picture into a corresponding 625 line picture, for intercontinental transmission. Such an arrangement is described in a series of articles in IBA Technical Review Issue 8, September 1976, subtitled Digital Video Processing—DICE, published by Independent Broadcasting Authority, 70 Brompton Road, London 5 W 3 1 EY, England. These arrangements are not capable of providing continuously variable expansion or compression of a given video input nor are they adapted for instantaneous change from an expansion mode to a compression mode. Furthermore, these standard conversion arrangements are not capable of functioning with multiple video inputs or the positioning of different inputs to provide a desired composite output image. Various types of frame store synchronizers have also been used in the past to store an incoming signal which is not synchronous with studio sync, as for example, a signal from a remote camera using low power microwave relay transmission, and scanning the stored incoming signal in synchronism with the broadcasting studio equipment. However, these arrangements are not capable of functioning with multiple video inputs or of selectively positioning different video inputs in a desired composite output image.

It is, therefore, a primary object of the present invention to provide a new and improved television special effects arrangement which overcomes one or more of the above-discussed disadvantages of prior art arrangements.

It is another object of the present invention to provide a new and improved television special effects arrangement wherein a multiplicity of television input signals may be stored in a memory having a capacity equal to the active portion of a single TV frame, the stored images being read out of the memory in a predetermined sequence to provide the desired composite output image.

It is a further object of the present invention to provide a new and improved television special effects arrangement wherein a plurality of input TV images may be combined to form a composite output image and each input image is capable of being positioned independently at different locations in the output image by movement in horizontal and vertical directions.

It is another object of the present invention to provide a new and improved television special effects arrangement wherein a plurality of input TV images may be combined to form a composite output image and each of the input images is capable of being compressed independently in the horizontal and/or vertical dimensions in said output image.

It is a further object of the present invention to provide a new and improved television special effects arrangement wherein a plurality of input TV images may be combined to form a composite output image, each input image being positionable at different locations in said output image and a priority sequence is established whereby the image of higher priority suppresses all elements of lower priority images in the areas in which they overlap.

It is another object of the present invention to provide a new and improved television special effects generator wherein a plurality of input TV images may be combined to form a desired composite output image, each input image being positionable to different locations in said output image and facilities are provided for introducing a predetermined background condition in those areas of said output image in which no input image occurs.

It is a further object of the present invention to provide a new and improved television special effects arrangement wherein a plurality of input TV images may be combined to form a composite television output image and a selected portion of the composite image may be magnified to fill the entire area of said output image.

It is another object of the present invention to provide a new and improved television special effects arrangement wherein a plurality of input TV images which are nonsynchronous with each other may be combined to form a composite output image, said output image being nonsynchronous with respect to some or all of said input TV images, and capable of being synchronous with a studio or other reference synchronizing signal.

Briefly, in accordance with one aspect of the invention, a plurality of analog video input signals are separately converted into digital signals or numbers representing various voltage levels of each analog signal. Each line of each TV image is divided into discrete picture elements and each element is separately converted into a digital signal or data word representing the amplitude of that particular picture element. These data words are then stored in a digital memory having sufficient capacity to store a full frame of the desired output TV image. The digital memory stores these data words in separate locations or memory slots each identifiable by a different address.

In accordance with one aspect of the present invention, addresses are assigned to the digitized picture elements or data words of each video input signal on the basis of the desired location of that picture element in the composite output TV image rather than assigning a separate address to each picture element of a video input signal on a fixed basis as is done in some existing frame store synchronizing devices. By controlling the addresses into which the digitized picture elements are written, as compared with assigning a fixed relationship between the addresses and the input signal elements, a much more versatile special effects arrangement is provided which has the capability of combining a multiplicity of video input signals in a single TV frame memory.

In accordance with a further aspect of the invention, horizontal and vertical positioning numbers are generated which are employed to control the addressing means associated with each video input signal so that the memory storage area at which picture elements of this video input signal are stored may be shifted to any portion of the output TV frame. Also, horizontal and vertical compression numbers are generated for each video input signal which control the addressing means for each video input signal so that the digitized picture elements thereof may be compressed to a small portion of the single frame memory. The size of each video input, as it appears in the output image, may thus be varied in either its horizontal or vertical dimensions by variation of the corresponding horizontal or vertical compression number.

The data words from a plurality of video inputs, which are stored at various locations in the common single frame memory, are read out of the memory by means of read address means which establishes a predetermined sequence corresponding to the desired composite TV output image. This permits each of the video input signals to be nonsynchronous with respect to the other video input signals and with respect to the readout sequence.

Accordingly, the present invention permits a wide variety of special effects to be generated from a number of nonsynchronous video input signals which are combined in the composite TV output image operating at studio sync.

In accordance with a further important aspect of the present invention, the read address generator means is also controlled by horizontal and vertical compression numbers so that a portion of the composite image stored in the memory may be expanded to fill the complete single frame TV output image. Also, facilities are provided for establishing a priority sequence between the video input signals so that when these input signals are shifted by means of the above-described horizontal and vertical position numbers and portions of two video input images overlap. Only the data words corresponding to the highest priority video input signal are stored in the single frame memory. Since it is also possible to shift the various video input signals by an amount such that no input signal is stored in certain areas of the memory, facilities are also provided for generating a desired background level during readout which is inserted into the composite output image in those areas which are outside the boundaries of all of the video inputs in the composite output image.

The invention, both as to its organization and method of operation, together with further objects and advantages thereof, will best be understood by reference to the following specification taken in connection with the accompanying drawings in which:

FIG. 8 is a diagrammatic illustration of the memory storage system used to store data words in the common memory storage of FIG. 1;

FIG. 9 is a block diagram of a portion of the common memory storage of FIG. 1 illustrating the manner in which luminance and chrominance I and Q components are stored separately in the common memory storage of FIG. 1;

FIG. 10 is a block diagram of a portion of the common memory storage used to store the chrominance I component;

FIG. 11 is a diagrammatic illustration of the manner in which luminance picture elements are compressed and stored in the common memory storage of FIG. 1;

FIG. 12 is a schematic diagram of the circuitry in the interpolator portion of FIG. 2 which develops the required horizontal and vertical multiplier coefficients; and FIGS. 13A, 13B and 13C, when arranged in the manner shown in FIG. 13D are a schematic diagram of the vertical interpolator portion of FIG. 2;

FIGS. 14 to 20, inclusive, are diagrammatic illustrations of various special effects which may be provided in accordance with the invention.

Figure 1:
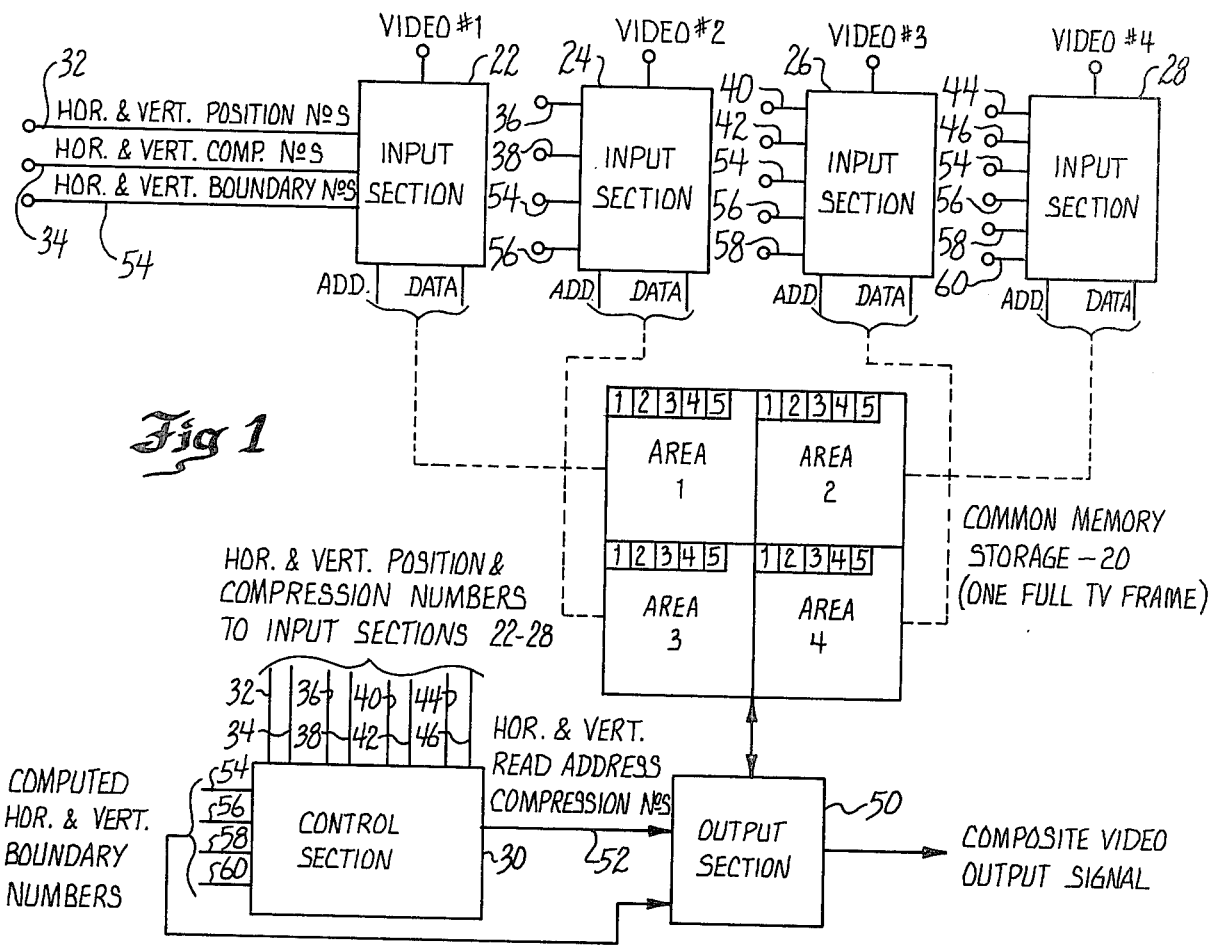
FIG. 1 is an overall block diagram illustrating the television special effects system of the present invention.

Referring now to the drawings and more particularly to FIG. 1 thereof the special effects system of the present invention is therein illustrated as comprising a common memory storage 20 which is capable of storing the picture elements corresponding to one full TV frame of a desired composite output image. A plurality of input sections 22, 24, 26 and 28, are provided for each of a plurality of independent video input signals indicated as video No. 1, video No. 2, etc. The four video input signals need not be synchronized with each other or with the scanning of the common memory storage 20 to provide the desired composite output signal. Also, it will be understood that a larger number of video input signals may be combined to form the composite output image if desired.

In each of the input sections, such as the input section 22, the analog video input signal is converted into digital signals or data words corresponding to the various analog voltage levels of successive picture elements of the video input and these data are stored in the common memory storage 20 by assigning a suitable memory storage address to each data word.

In accordance with an important aspect of the invention, the addresses assigned to different picture elements of each video input signal are assigned on the basis of the desired location in the common memory storage 20, i.e. the desired location of an input picture element in the desired composite output image. This means that a picture element of any one of the four video input signals may be stored in any desired area of the common memory storage 20 by assigning the correct address to such picture element. It is convenient to divide the memory addresses of the common memory storage 20 into two groups, one (the horizontal address) corresponding to the position of the output picture element along the output horizontal line, and the other (the vertical address) corresponding to the position of the TV line within the output frame. However, insofar as the digital memory 20 itself is concerned, the addresses are mere numbers which may be assigned in any predetermined order. It is also convenient to compute the horizontal addresses consecutively, that is, increasing by one from each element to the next, and the vertical addresses increasing by one from each line to the next. The addresses for each input signal may be computed, starting from the horizontal sync pulse of that video input for the horizontal address and starting from the vertical sync pulse of that video input signal for the vertical address.

Considering first a single video input, if the horizontal address is then incremented by one for each picture element and the vertical address is incremented by one for each horizontal line the input signal will be written into locations in the common memory storage 20 which are assigned to the corresponding picture elements in the output picture and will be displayed at the output as a normal-sized image centered in the screen. If, now a constant is added to or subtracted from the horizontal address the input signal will be written into memory locations displaced to the right or to the left, respectively, in terms of the relationship of the memory locations to the elements of the output picture. Consequently, when read from the memory, the displayed image will be displaced to the right or left on the screen.

In a similar way addition or subtraction of a constant to the vertical address will result in the picture being displaced vertically. Thus, the input picture may be positioned anywhere within the screen area by adding or subtracting appropriate constants to the horizontal and vertical addresses. The constants which may be added to or subtracted from the horizontal and vertical addresses are designated as horizontal and vertical position numbers and are generated in a control section 30, different sets of horizontal and vertical position numbers being supplied to each of the input sections 22-28. Thus, the first set of horizontal and vertical position numbers are supplied over the conductors 32 to the input section 22, the second set over the conductors 36 to the input section 24, the third set over the conductors 40 to the input section 26 and the fourth set 44 to the input section 28. These horizontal and vertical position numbers may be adjusted, for example, by means of suitable positioning controls on the front panel of the control section 30 so that any one of the four video input signals may be adjusted so that the corresponding picture may be positioned anywhere within the output screen simply by adjustment of the corresponding horizontal and vertical control members on the control panel 30.

Considering still the situation where only a single video input signal is applied to the common memory storage 20 it will be evident that as the picture is displaced from center there will be parts of it which will fall outside the output picture area as defined by the full TV frame of storage in the common memory storage 20. In terms of the write addressing operation, this occurs when addition of a constant, i.e. a horizontal or vertical position number followed by incrementing of the horizontal or vertical address, results in an address number larger than exists in the memory 20, or when subtraction of a constant results in negative addresses. Under either of these situations no data will be written in the memory, as will be described in more detail hereinafter.

In the discussion thus far we have assumed that the addresses are incremented by one for each horizontal picture element and each horizontal line, respectively, which results in a full-sized image. If, now the addresses are incremented not by one but by a fractional number less than one, then the input data will be written into a smaller range of addresses, and when read out of the memory will be displayed as a compressed picture. There are, of course, no fractional addresses in the digital common memory storage 20, so that when the address is incremented by a fractional amount, only the integral part of the resulting number will form the memory address. For example, let us assume that the compression factor chosen is three-fourths, it being understood that computations are actually performed in binary arithmetic. The addresses computed for successive picture elements, or for successive horizontal lines in the case of vertical addresses, will then follow the sequence: $\frac{3}{4}$; $1\frac{1}{2}$; $2\frac{1}{4}$; 3; $3\frac{3}{4}$; $4\frac{1}{2}$; $5\frac{1}{4}$; 6; etc. These elements will be written into the following actual addresses: (not written), 1, 2, 3, (not written), 4, 5, 6.

Thus, when there is no change in the integral part of the address number, no writing of data into the memory takes place. It will be noted that of the eight elements considered, only six have been written in the example where a compression factor of $\frac{3}{4}$ is used. When the stored elements are in due course read out of the memory, they will occupy six elements in the output image. The result is that, in this example, eight elements of the input image have been compressed into six elements of the output image, i.e. the picture has been compressed in size by a factor of $\frac{3}{4}$. It will also be understood that any desired compression factor, which is less than or equal to unity, may be chosen. This factor may also be varied to give a variable size of output image. The horizontal and vertical compression numbers are computed in the control section 30 and are supplied to each of the input sections associated with the four video input signals. Thus, for example, a first set of horizontal and vertical compression numbers are supplied by way of the conductors 34 to the input section 22. Independently variable horizontal and vertical compression numbers are also supplied by way of the conductors 38, 42 and 46 to the input sections 24, 26 and 28, respectively. Since the compression factors for horizontal and vertical addresses may be controlled separately with respect to each of the four video input signals, and at the same time the position of each video input signal in the composite output image may be varied by adjustment of the horizontal and vertical position numbers associated therewith, and each of these functions may be separately controlled for each input image, a wide range of effects is possible with the special effects system of the present invention. For example, if it is desired that the first video input signal occupy area No. 1 in the upper left-hand quadrant of the composite output image, the horizontal and vertical position numbers, and the horizontal and vertical compression numbers supplied to the input section 22 from the control section 30 are adjusted so that selected picture elements of the first video input signal are stored in area No. 1 of memory storage 20, the composite data word for each picture element which is to be stored being transmitted over a set of data conductors to the common memory storage 20 and the address assigned thereto being simultaneously supplied over a set of address conductors to the common memory storage 20. In a similar manner the second video input signal may be stored in the lower left-hand quadrant of the composite output image by suitable adjustment of the horizontal and vertical position numbers and the horizontal and vertical compression numbers supplied to input section 24. Similarly, input section 26 may be controlled so that the compressed picture elements of the third video signal are supplied to the lower right-hand quadrant, i.e. area No. 4 of the common memory storage 20 and selected picture elements of the fourth video input signal may be supplied to the upper right-hand quadrant, i.e. area No. 2, by adjustment of the horizontal position numbers and horizontal and vertical compression numbers supplied to input section No. 28. It will be appreciated that the above choice of areas in the output image is made only by way of illustration and that the picture elements of any one of the four video input signals can be positioned at any location in the common memory storage 20 by assigning the corresponding memory address to that picture element. one of the four video input signals can be positioned at any location in the common memory storage 20 by assigning the corresponding memory address to that picture element.

Considering further the situation where one of the video input signals is compressed by employing the above-described compression factor to develop sequential write addresses, it will be noted that since only integral addresses are present in the memory while the compression process may call for fractional spacing between the elements of the input image, some input elements are not written and those that are written are unevenly spaced. Although these errors are small, being only a fraction of the picture element spacing, or the horizontal line spacing vertically, it may be desirable to compensate for them. This is done in accordance with the present invention by interpolation of the data between successive picture elements, or successive horizontal lines, to give a new data value which is a closer representation of the value which the data would have at the points at which it is written, were it a continuously varying function instead of discrete samples at picture element or line intervals.

To this end, each of the input sections 22 includes an interpolator which is effective to add proportions of two successive data words, or the corresponding data words on two successive horizontal lines, these proportions being computed from the fractional part of the computed address for each element or line. Thus, in the previous example of a compression factor of $\frac{3}{4}$ the first few computed addresses were: $\frac{3}{4}$; $1\frac{1}{2}$; $2\frac{1}{4}$; etc. On the first of these computed addresses no writing into the memory takes place; on the second a write into memory address one; and on the third into memory address two. Instead of writing the second data word into address one, the interpolator is employed to mix proportions of the first and second data words to obtain an interpolated value. In general if the computed address consists of an integer plus a fractional part F we require to mix F/a of the word preceding the address with (1−F/a) of the word following the address, where "a" is the compression factor being utilized at that time.

In the above example using a compression factor of $\frac{3}{4}$, when writing into memory address one takes place the fractional part of the memory address is $\frac{1}{2}$. The required proportions under these conditions are F/a=$\frac{2}{3}$ of the word preceding the address, i.e. the first picture element and $(1-\frac{2}{3})=\frac{1}{3}$ of the second picture element. Thus, the data written into the memory address one when a write address of "$1\frac{1}{2}$" is generated will consist of $\frac{2}{3}$ of the first data word and $\frac{1}{3}$ of the second. Similarly, when a memory address of "$2\frac{1}{4}$" is generated as the third computed address, the remainder of $\frac{1}{4}$ indicates that $\frac{1}{3}$ of the second data word is mixed with $\frac{2}{3}$ of the third data word and written into memory address two. This interpolation process is shown in more detail in FIG. 11 which illustrates the manner in which the first ten picture elements A-J of one horizontal line are interpolated in accordance with the present invention. Immediately beneath the picture elements A-J, inclusive, is shown the computed memory address using a compression factor of $\frac{3}{4}$. The fractional portion of each address is employed to compute the required proportions of the preceding picture element and the element corresponding to the generated address to provide a composite data word which is stored in the memory. In FIG. 11 the first seven horizontal memory slots in the common memory storage 20 are shown and immediately below these slots the data word proportions which are mixed and stored in each slot are given. Thus, when the memory address "$1\frac{1}{2}$" is generated the integer 1 is employed as an address to store data in horizontal memory slot one and the fractional part F=$\frac{1}{2}$ is employed in the interpolator to mix $\frac{2}{3}$ of data word A with $\frac{1}{3}$ of data word B, this composite data word being stored in horizontal memory slot one. When the composite memory address "$2\frac{1}{4}$" is generated, the integer 2 is employed as the horizonal memory address and the fractional part $\frac{1}{4}$ is employed to control the interpolator to mix $\frac{1}{3}$ of data word B and $\frac{2}{3}$ of data word C, this composite data word being stored in horizontal memory slot 2. When the fourth address "3" is generated no fractional part remains and hence the integer 3 is employed to store data word D by itself in memory slot 3. When the fifth memory address "$3\frac{3}{4}$" is generated, the integer portion 3 of the memory address has not changed from the previous address and hence no further writing of data into memoryy slot 3 takes place. When the sixth write address "$4\frac{1}{2}$" is computed, an action similar to the second generated address "$1\frac{1}{2}$" is provided, etc.

The above-described process of interpolation is applied in both the horizontal and vertical directions, as will be described in more detail hereinafter, and effectively smooths out the irregularities in the addressing which could otherwise result in a spurious zig-zag effect on slanting edges which may be present in the input image.

The above-described arrangement for generating addresses into which the input data may be written, these addresses taking into account desired horizontal and vertical positioning and compression of the input image, may be accomplished simultaneously for any desired number of video inputs, such as the illustrated inputs video No. 1–video No. 4. However, the write addresses generated in each of the input sections 22–28 may occur at any time since each of the video input sources may be nonsynchronous and each address is timed independently in connection with the respective horizontal and vertical synchronizing pulses of the corresponding video input signal. Present digital memory devices are restricted to the capability of either writing or reading from a single address at a time. It is not possible either to read and write simultaneously or to write several data inputs simultaneously into different addresses. For the purposes of this invention it is desirable to be able to write several inputs from different addresses while at the same time reading from the memory to generate the desired composite output image. Since these operations cannot be performed simultaneously, they must be done in sequence. However, the speed of presently available memory devices is not adequate to perform all of the write operations and the read operation in sequence within the time of one horizontal picture element. In accordance with a further aspect of the invention, the common memory storage 20 comprises a plurality of groups of memory devices which are sequenced so that each will successively write each of the video inputs in turn and also read the desired output while the other groups of devices are separately acting on their respective inputs or output data. For example, if there are to be four inputs plus one output, then if it were possible to perform a read or write operation within the time of one horizontal picture element, five groups of devices could be used each sequencing through the five operations (four writes plus one read), the sequence being staggered so that each group would successively handle each of the five operations. However, splitting the memory into five groups means that the possible addresses are divided between the five groups. Because the signals are nonsynchronous and may have independently, any value of position or compression, it is possible for two or more operations (write or read) to require simultaneous access to addresses which all fall in the same group. This problem is avoided in accordance with the present invention by providing buffer registers associated with each memory group which serves temporarily to hold the data and addresses from each of the inputs and the output. The incoming data words and their destination addresses are stored in these registers at the time they occur, and the registers are then sequentially accessed to write the data into the memory. Similarly, the read address may be stored and accessed as part of this sequence, and the data read from the memory in turn stored in a register from which it may subsequently be read. Since the input and output addresses are sequential because the above-discussed addressing arrangement is related to the television line and element sequence, conflicting requirements for two or more operations to access the same memory simultaneously are avoided. In this connection it is also pointed out that the previously described write addressing arrangement for compressing the image, in which some data words are not written, does not call for any discontinuity in the sequence of write addresses.

While the above general description of the requirements of the common memory storage 20 has referred to five groups of memory devices as the minimum number for handling four inputs and one output, the number of groups of memory devices is preferably made substantially larger because of the limited speed of available memory devices, as will be described in detail hereinafter. The larger the number of groups into which the common memory storage 20 is divided, the greater will be the time available for the memory to perform the four write and one read operations before being required to repeat the sequence on the next set of words and addresses.

The digitized picture elements of the four video input signals, which are thus stored in the common memory storage 20, may be read out of the common memory storage 20 in any desired sequence to provide a composite TV image. To this end, an output section 50 is provided which includes a read address generator which is arranged normally to generate sequential read addresses corresponding to consecutive memory slots in the common memory storage 20. Accordingly, the data words stored in consecutive memory slots, each of which corresponds to a digitized picture element of one of the four video input signals, are sequentially supplied to the output section 50 wherein the stored digital number is converted to a corresponding analog picture element and the resulting composite analog video signal is combined with synchronizing pulses and blanking intervals to provide a composite video output signal.

In the system described thus far a number of input images may be combined into the single memory storage 20, which has a capacity of one full TV frame, from which the data may be read out as a composite TV frame. Each of the input video signals may be independently compressed and positioned in both the horizontal and vertical dimensions. However, the maximum size of each video image is its normal full size. It would be desirable to magnify the images as well as to compress them. The function of magnifying the images cannot conveniently be performed during the writing operation when digitized picture elements are stored in the common memory storage 20, since incrementing the writing addresses by a number greater than unity will cause some addresses to be skipped. In the type of memory devices normally employed, if a memory slot is not written into during a particular frame, the slot retains the data which it previously held. Accordingly, skipping addresses during the writing operation would result in data from prior TV frames remaining in the memory and being read out during the read operation so that magnification of a particular image or portion of an image is effectively prevented.

In order to avoid this condition and in accordance with an important aspect of the present invention, the magnification of a particular portion of the output image is performed by compressing the read addresses generated by the read address generator in the output section 50. More particularly, horizontal and vertical read address compression numbers are developed by the control section 30 and supplied to the output section 50 by way of the conductors 52. These read address compression numbers are employed to reduce the rate at which the horizontal and vertical read addresses are generated by the output section 50. In this zoom or magnification mode of operation, the memory addresses no longer correspond to specific picture elements in the output image, but instead correspond to the elements which would obtain if the image were not magnified. This mode of operation may be considered as a two-stage process, i.e. firstly compressing and positioning the video inputs to form a composite image which is stored in the memory, and secondly selecting a portion of this memory "image" to form the full output image. It will be realized that reading only a compressed area of the "image" and using this data to form the output signal which is displayed as a full TV image is equivalent to magnifying the selected part of the "image."

The generation of compressed addresses for the read operation is performed in the same way as the generation of compressed writing addresses, as described heretofore in connection with the input sections 22-28. However, when the condition occurs that no change takes place in the integral part of the address,—which in the write computation results in a "no write" condition—in the read operation no read will occur. The buffer register associated with the data output from each memory section, as discussed heretofore, will then retain the previously read data, so that in effect the same data element has been expanded for two picture elements of the composite output image.

In accordance with a further aspect of the invention, a process of interpolation is also applied to the read data in a manner similar to that described heretofore in connection with the write operation. Thus, when the computed read address consists of an integer plus a fractional part F it is necessary to mix a fraction F of the word addressed with a fraction $(1-F)$ of the preceding data word. This results in a composite data value corresponding to a point one element of one line (in the horizontal and vertical computations respectively) behind the computed address. This is compensated for in accordance with the present invention by adding one to the read address number, i.e. reading one address ahead of the desired instantaneous position in the image.

It will be appreciated that the above-described magnification of the stored output image cannot produce greater resolution than was present in the input image. The read interpolation process discussed above avoids magnification of the original TV line structure but cannot add information not originally present. The extent to which magnification may, in practice, be employed is therefore limited by the resolution desired in the expanded output image. This limitation does not apply when the input image is initially compressed since the resolution is then determined by the limits of the TV standard and is independent of the compression factor.

Since the magnification of the images cannot conveniently be performed during the writing operation, as discussed above, and since a process of interpolation may be applied to the read data also as described heretofore, when the input video signals comprise color TV signals, as distinguished from black and white, additional problems arise. It will be appreciated that compression or magnification of a TV image results in a scaling of all components of the frequency spectrum of that image. In color TV systems in which the color information is contained in a subcarrier included in the composite signal, it is important that the frequency of the subcarrier should not be changed. However, since the phase of the color subcarrier reverses each horizontal line it is not possible to perform the above described process of interpolation with the subcarrier present. Direct application of the processes of compression and magnification to a color signal is not therefore possible. It is necessary to separate color and luminance information in the composite signal and to demodulate the color information into separate I and Q chrominance signals. The above-described process of interpolation is then performed on the separated luminance information. The I and Q signals are then treated as normal video signals and together with the luminance signal interpolated as previously described, the luminance and I and Q chrominance signals are stored in separate memories with the addressing being common to all three memories. In the output section 50 the three signals are recombined to form the composite color signal, as will be described in more detail hereinafter.

In the system of FIG. 1 the horizontal and vertical position numbers applied to each of the input sections 22-28 may be adjusted so that a picture element of any one of the four video input signals may be assigned an address corresponding to any desired point on the composite output image. Under these conditions the situation will arise where parts of the video input images are called upon to overlap. In the absence of any provisions for this situation, whichever input was last in time in being written into the common memory storage will be the one which will appear when the memory is read. Since the timing depends on the timing of the original TV synchronizing pulses, together with the position and compression values assigned to the input, the desired input might be overwritten by another input.

In order to avoid this situation, and in accordance with a further aspect of the invention, the four video inputs may be assigned a priority sequence. For example, video input No. 1 may always be written into the common memory storage 20; video input No. 2 will be written except within the boundaries of the video No. 1 input; video input No. 3 wil be written except within the boundaries of either video input No. 1 or video input No. 2, etc. Such a priority sequence is achieved by computing the boundaries of each input and comparing the write addresses of the lower priority video inputs to these boundaries. Thus, in the illustrated example, the top boundary of the unrestricted video No. 1 input is computed in the control section 30 by taking the vertical position number for video No. 1 (supplied over the conductor 32 to the input section 22) less the product of the vertical compression factor (expressed as a fraction) and half the number of lines in the picture height. The bottom boundary of the video No. 1 input is computed by taking the vertical position number plus this same product. In a similar manner the left and right boundaries of the video No. 1 input signal may be computed from the horizontal position number and the horizontal compression number and the number of horizontal picture elements in the picture width.

For example, if a vertical position number of 125 is supplied over the conductors 32 to the input section 22, a vertical compression factor of ½ to the conductor 34 and it is assumed that 483 lines of the video No. 1 input comprise the active portion of the TV frame, the top boundary number of the video No. 1 input would be 125 minus (¾×483/2). The bottom boundary number under these conditions would be 125 plus (¾×483/2). The left boundary number for video input No. 1, assuming a horizontal position number of 60, a horizontal compression factor of 5/6 and a total of 768 picture elements in each horizontal line, would be 60 minus (5/6×768/2). The right boundary for video input No. 1 under these conditions would be 60 plus (5/6×768/2). These four boundary numbers, which are computed in the control section 30, are supplied by way of the conductors 54 to each of the lower priority video input sections 24, 26 and 28. The left boundary and top boundary numbers are also supplied in the input section 22 to be used in generating the horizontal and vertical addresses, respectively, as will be described in more detail hereinafter.

In a similar manner the horizontal and vertical boundary numbers for video input No. 2 are computed in the control section 30, by utilizing the horizontal and vertical position numbers on the conductors 36, the horizontal and vertical compression numbers on the conductors 38 and the same assumed number of lines, i.e. 483 in the picture height and the same number of horizontal picture i.e. 768 in the picture width. The resultant horizontal and vertical boundary numbers are supplied by way of the conductors 56 to the lower priority input sections 26 and 28. Similarly, the horizontal and vertical boundary numbers for video input No. 3 are computed in the control section 30 and are supplied by way of the conductors 58 to the input section 28.

In each of the input sections 24, 26 and 28, the horizontal and vertical boundary numbers which are supplied from the control section 30 in the manner described above are compared with the write address generated by the write address generator in each input section. For example, the horizontal write address assigned to a particular picture element in the video No. 2 input signal will be compared with the left and right boundary numbers appearing on the conductors 54, these boundary numbers corresponding to the left and right boundaries of the video No. 1 input signal. In a similar manner the vertical write address of this digitized picture element of video signal No. 2 is compared with the top and bottom boundary numbers, appearing on the conductors 54, corresponding to the top and bottom boundaries of video signal No. 1. If both the horizontal write address of video No. 2 lies between the left and right boundaries of video No. 1 and the vertical write address lies between the top and bottom boundaries of video No. 1 then writing of the video No. 2 picture element data into the memory slot of the common memory storage 20 corresponding to these horizontal and vertical write addresses is inhibited, as will be described in more detail hereinafter.

In a similar manner the horizontal and vertical write addresses assigned to a particular digitized picture element of video No. 3 are separately compared with both the boundary numbers of video No. 1 and video No. 2. If the video No. 3 write address falls within the boundaries of either video input No. 1 or video No. 2 writing of the video No. 3 data into that address is inhibited. The video No. 4 write address generated in the input section 28 is likewise separately compared with the boundary numbers corresponding to all three higher priority video input signals, i.e. the numbers appearing on the conductors 54, 56 and 58 and if the write address is within any of these boundaries writing into the common memory storage 20 is inhibited. It will be appreciated that the above comparisons between boundary numbers and the generated writing address must be done each time the writing address is changed.

In the system of FIG. 1 the condition can also arise in which the several video inputs are so positioned and compressed that certain addresses in the common memory storage 20 do not have any data words written into them. To provide for this condition, and in accordance with a further aspect of the invention, the horizontal and vertical boundary numbers for the video input No. 4 are computed in the control section 30 and are provided on the output conductors 60 thereof. All of the horizontal and vertical boundary numbers for the four video input signals are then supplied by way of the conductors 54, 56, 58 and 60 to the output section 50 wherein a comparison is made between the read address generated by the read address generator in the output section 50 and the horizontal and vertical boundaries of all four video input signals. If the read address lies within the boundaries of any input the data word at the corresponding slot of the common memory storage 20 is read and supplied to the output section 50. However, if the generated read address lies outside the boundary numbers of all four video inputs an alternative preselected signal is fed into the output of the system. This signal may, for example, correspond to black level or some other predetermined color, as will be described in more detail hereinafter. Under these conditions it is irrelevant whether the actual read operation takes place in the common memory storage 20 since if it does the data will not be used, as explained hereinafter.

Figure 2:
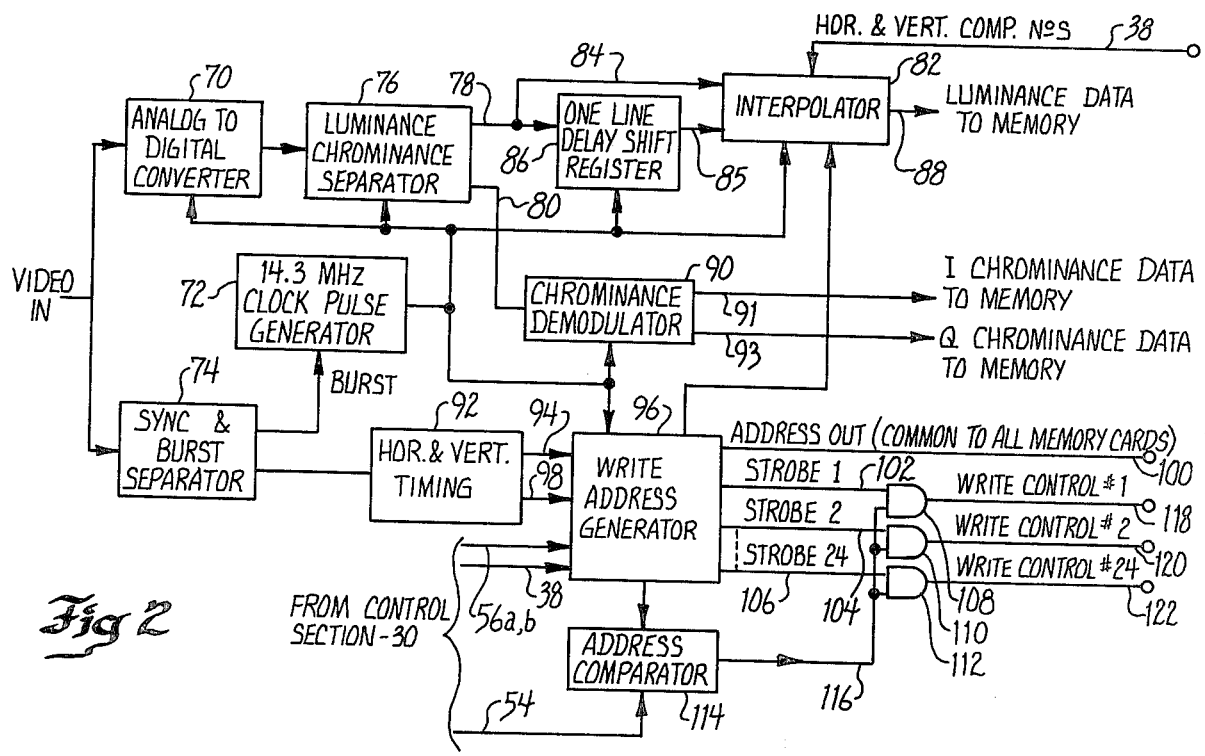
FIG. 2 is a block diagram of the input section provided for each video input signal in the system of FIG. 1.

Referring now to FIG. 2 wherein one of the input sections 24 is shown in more detail, the video input signal is supplied to an analog to digital converter 70 wherein successive picture elements of each horizontal line are converted into corresponding digital signals representing the amplitude of the analog signal at discrete points along each horizontal line. Each horizontal line is divided into discrete picture elements by means of a clock pulse generator 72 which maintained in synchronism with the video input signal by means of the color burst signal derived from the synchronizing signal and burst separator 74. Preferably the clock frequency is chosen to be an even multiple of the color subcarrier frequency and in the illustrated embodiment the clock pulse generator 72 has a frequency of 14.3 MHz. so that each horizontal line is divided into a total of 768 discrete picture elements. The output of the analog to digital converter 70 thus comprises a binary number which may, for example, comprise an eight bit number representing the amplitude of the video signal for that particular picture element, this binary number being referred to as a data word. The luminance and chrominance components of each picture element are separated in a luminance-chrominance separator 76 which provides luminance data words on the output conductor 78 thereof and chrominance data words on the output conductor 80. The chrominance data words are developed by digitizing four points on each cycle of the subcarrier so that information which represents plus I, minus I, plus Q and minus Q is derived from these four points on the color subcarrier.

The analog to digital converter 70 and luminance-chrominance separator 76 may comprise any suitable arrangement for developing these luminance and chrominance data words. For example, the article entitled Digital Coding and Blanking by A. Bellis and P. R. Corman on pp. 63–76 of the IBA Technical Review article referred to previously described a suitable arrangement.

As discussed generally heretofore, it is desirable to employ an interpolator 82 when the video input signal is compressed. The luminance data words are supplied directly to the interpolator 82 over a first input conductor 84 and are also supplied through a one-line delay shift register 86 to a second input conductor 85 so that the interpolator 82 is continuously supplied with two inputs consisting of the luminance data words corresponding to the same picture elements of two successive horizontal lines in the video input signal. The composite luminance data words developed in the output of the interpolator 82 are then supplied by way of the conductor 88 to the luminance data memory cards of the common memory storage 20, as will be described in more detail hereinafter.

The I and Q chrominance signals are demodulated in a chrominance demodulator 90 and the separate I and Q chrominance data words which are not interpolated are supplied to the respective I and Q memory cards of the common memory storage as will be described in more detail hereinafter.

The horizontal and vertical synchronizing pulses, which are separated from the video signal in the sync and burst separator 74, are separated from each other in the horizontal and vertical timing circuit 92, the horizontal synchronizing pulses being supplied by way of the conductor 94 to a write address generator 96 and the vertical synchronizing pulses being supplied by way of the conductor 98 to the address generator 96. The write address generator 96, which is also controlled from the clock pulse generator 72, provides horizontal and vertical output addresses on the conductors 100 which are supplied to all of the luminance and I and Q chrominance memory cards in the common memory storage 20. The write address generator 96 is also supplied with horizontal and vertical compression numbers, which are computed in the control section 30 for each input section, over the conductor 38. The generator 96 is also supplied with the left boundary number and top boundary numbers computed in the control section 30, for the video No. 2 input, over the conductors 56a and 56b, as will be described in more detail hereinafter.

As discussed generally heretofore, the speed of presently available memory arrays is not sufficient to permit picture elements from all four of the video input signals to be written into the common memory storage 20 and the desired composite output image read from the memory 20 within the time of one horizontal picture element.

According, it is necessary to divide up the common memory storage 20 into a series of memory storage arrays or cards which are sequentially strobed by the write address generator 96 so that each data word may be written into a particular memory card and read from the memory card at a much lower rate. In the illustrated embodiment, the common memory storage 20 is comprised of twenty-four luminance data memory cards, which are successively employed to store data words corresponding to twenty-four successive picture elements in each horizontal line. To this end the write address generator provides a series of twenty-four strobe signals which are produced at the rate of the clock pulse generator 62 and are supplied to twenty-four separate output conductors three of which are shown in FIG. 2 as the conductors 102, 104 and 106. However, in order to accommodate the system of priorities between different video input signals, as discussed generally heretofore, these strobe signals are not employed directly to control writing of data words into the memory but instead are supplied as one input to a series of twenty-four AND-gates three of which are shown as the AND-gates 108, 110 and 112. The other input of each of these AND-gates is controlled by the output of an address comparator 114. The address comparator compares the write address output of the generator 96 with the horizontal and vertical boundary numbers computed in the control section 30 and supplied to each of the video input sections 24, 26 or 28 in accordance with the above-described system of priorities. Thus, if the input section shown in FIG. 2 represents the input section 24 of the second video signal, the computed horizontal and vertical boundary numbers are supplied by way of the conductors 54 to the address comparator 114, these horizontal and vertical boundary numbers representing the horizontal and vertical boundaries of the first video input signal, as described in detail heretofore. The address comparator 114 compares the horizontal address developed by the write address generator 96 with the left and right boundaries of the higher priority video input signal No. 1 and also compares the vertical address generated by the generator 96 with the top and bottom boundaries of video input No. 1. If the generated horizontal address lies between the left and right boundaries of the higher priority video input signal and the vertical address also lies between the top and bottom boundaries of this input then no enabling signal is supplied over the conductor 116 to the AND-gates 108, 110 and 112 so that no write control signal is supplied over any one of the twenty-four write control conductors, three of which are shown in FIG. 2 as the conductors 118, 120 and 122, and no writing into the common memory storage 20 occurs for picture elements of the lower priority video input No. 2 which fall within the boundaries of the higher priority video input No. 1. However, if either the horizontal write address developed by the generator 96, or the vertical write address developed by this generator falls outside the boundaries of the higher priority video input then an enabling signal is supplied over the conductor 116 to the AND-gates 108, 110 and 112. Accordingly, write control signals are sequentially supplied to the twenty-four write control output conductors during periods when the address comparator 114 enables the AND-gates 108, 112. In the input section of an even lower priority video input, comparisons are performed separately for the boundaries of each of the higher priority video inputs and writing of the corresponding data word is inhibited if the write address developed by the generator 96 falls within the boundaries of any higher priority video input signal. Thus, in the input section 28 a series of address comparators 114 are provided which separately compare the horizontal and vertical write addresses developed by the generator 96 with the horizontal and vertical boundary numbers appearing respectively on the conductors 54, 56 and 58 corresponding to the boundaries of the three higher priority video input signals. The outputs of these three address comparators are then suitable AND-gated so that when all three address comparators provide an enabling signal and the AND-gates 108, 112 are enabled during that period so that writing into the memory for video No. 4 is accomplished only when the generated write address is outside the boundaries of all three higher priority input signals.

Figure 3:
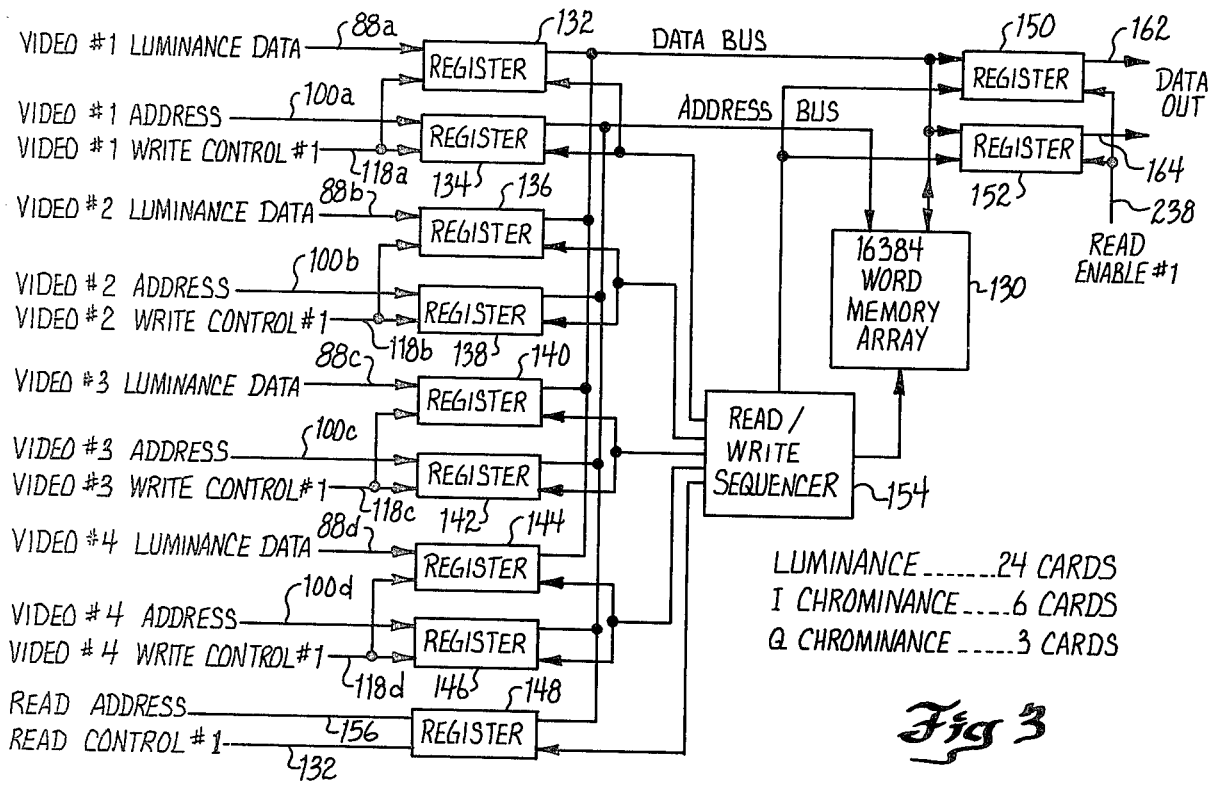
FIG. 3 is a block diagram of a portion of the luminance section of the common memory storage in the system of FIG. 1.

Considering now in more detail the common memory storage 20, it will be recalled from the preceding general description that this memory is of sufficient capacity to store the data words corresponding to the picture elements of one full TV frame, i.e., the desired composite output image. However, due to the relatively slow speed of present day memory arrays, it is necessary to divide this full TV frame into a number of separate memory arrays corresponding to different portions of the desired output image, these arrays being sequentially strobed so that data words from the four video input signals may be written into each array and the stored data words read out of the memory at a relatively slow rate. More particularly, common memory storage 20 comprises a series of twenty-four memory cards for storing luminance data words. One such memory card is shown in FIG. 3 and includes a 16,384-word memory array 130. When twenty-four of such memory arrays 130 are employed, sufficient storage is provided for one full TV frame consisting of the data words corresponding to 768 horizontal picture elements multiplied by 483 lines which make up the active components of one full TV frame. Since all of the four video input signals are nonsynchronous with respect to each other, the write addresses and corresponding luminance data words may occur simultaneously or two or more inputs to the memory 130. Accordingly, it is necessary to provide temporary storage on each memory card for both the write address and the corresponding luminance data word from each of the four video input signals. More particularly, a first buffer register 132 is provided to store a luminance data word supplied over the conductor 88a from the video No. 1 input section 22, and a buffer register 134 is employed to temporarily store the write address assigned thereto which is supplied over the conductor 100a from the first video input section 22. The write control No. 1 signal which is developed on the conductor 118a in the input section 22 is employed to enable both of the registers 132 and 134 so that the write address and its corresponding luminace data word are not temporarily stored in the registers 132, 134 unless a write control No. 1 signals is also developed on the conductor 118a. Since the video input section 22 is the highest priority video input, in the input section 22 the address comparator 114 and the AND-gates 108–112 are not required so that a write control No. 1 signal is always produced corresponding to the first strobe signal developed by the write address generator 96.

In a similar manner the registers 136, 138 are employed to temporarily store the write address and corresponding luminance data word developed in the input section 24 of the video No. 2 input signal, the corresponding input conductors being indicated as 88b, 100b and 118b. Since the input section 24 is of lower priority than the input section 22, situations may arise where the write address for the video No. 2 picture element fails within the boundaries of the video No. 1 signal. Under these conditions no enabling write control No. 1 signal is produced on the conductor 118b, so that the corresponding write address and luminance data word are not stored in the registers 136, 138. A similar set of registers 140, 142 is provided to store the write address and luminance data word for the video No. 3 input signal, and the registers 144, 146 are provided for temporary storage of the write address and luminance data word corresponding to video No. 4.

A buffer register 148 is provided for temporary storage of the read address developed by the read address generator in the output section 50 and two buffer registers 150, 152 are provided 150, 152 are provided to temporarily store data words read from the memory 130 which correspond to the same picture element on two successive horizontal lines of the desired output image. To this end, the memory 130 is divided into two sections, one section corresponding to the odd horizontal lines and the other section corresponding to the even horizontal lines in the desired output image. The data bus for the odd horizontal line section is connected to the register 150 and the data bus for the even horizontal line section is connected to the register 152. The least significant digit of the vertical read address which is stored in the register 148 is ignored so that when a read operation is performed the luminance data words for both an odd and an even horizontal line are simultaneously stored in the registers 150 and 152. The data words stored in the registers 150, 152 are then supplied to an output interpolator in the output section 50, as will be described in more detail hereinafter.

In order to scan the four input signals and read data from the memory 130 in a predetermined sequence, a read/write sequencer 154 is provided which sequentially energizes the registers for each video input signal and the registers 148, 150, 152 employed during readout. More particularly, the sequencer 154 first enables the registers 132, 134 so that the luminance data word stored in the register 132 is supplied to the common data bus of the memory array 130 while at the same time the write address stored in the register 134 is supplied to the address bus of the memory 130 so that the luminance data word is stored in the correct memory slot within the memory 130. In a similar manner the registers 136, 138 are then sequentially energized by the sequencer 154 so as to store the luminance data word corresponding to the video No. 2 input at the address stored in the register 138. The third and fourth video input signals are then sequentially stored in the memory 130 during the third and fourth intervals of the sequencer 154. During the fifth interval of the sequencer 154 the register 148 is enabled so that a read address is supplied to the address but of the memory 130 while at the same time the registers 150, 152 are enabled so that the data words on two adjacent odd and even horizontal lines corresponding to a particular digitized picture element on each of these lines is registered in the registers 150, 152. As will be described in detail hereinafter, the output section 50 provides a read address which is supplied over the conductor 156 to the register 148 and a read control No. 1 signal which is supplied over the conductor 232 to control storage of the read address in the register 148. The output section 50 also supplies a read enable No. 1 signal on the conductor 238 which is employed to enable readout from the registers 150, 152, the read enable No. 1 signal on the conductor 238 being slightly delayed with respect to the read control No. 1 signal on the conductor 232 so as to permit luminance data words to be read out from the memory 130 into the registers 150, 152 before they are supplied to the interpolator portion of the output section 50 over the conductors 162, 164.

It is pointed out that the circuitry shown in FIG. 3 comprises only one luminance data card and that twenty-four such cards are required to make up the total number of memory slots required for the common memory storage 20 equal to one full TV frame. Each of these luminance data cards is sequentially controlled by the twenty-four write control signals developed in each of the input sections 22–28. For example, in the second luminance data card, the registers 132, 134 would be controlled by the video No. 1 write control No. 2 signal appearing on the conductor 120a of the input section 22, the registers 136, 138 would be controlled by the video No. 2 write control No. 2 signal on the conductor 120b, etc. Similarly, on the 24th luminance data card the registers 132, 134 would be controlled by the video No. 1 write control No. 24 signal appearing on the conductor 122a, the registers 136, 138 would be controlled by the video No. 2 write control No. 24 signal on the conductor 122b, etc.

In order to illustrate the manner in which the write addresses and their corresponding luminance data words are distributed between the twenty-four memory cards, reference may be made to FIG. 8 wherein a portion of the write addresses are shown for the first horizontal line No. 1 and the last horizontal line No. 483 in the active TV output image. As discussed previously, each horizontal line of the composite output image comprises 768 picture elements. These picture elements are divided into thirty-two groups of twenty-four consecutive horizontal addresses, it being recalled that a digitized picture element may be assigned any address in the composite output image. Each of the luminance memory arrays 130 is employed to store thirty-two luminance data words corresponding to a horizontal address from each of the thirty-two groups of horizontal addresses. The array 130 may comprise a 32 ×512 element array, the elements beyond horizontal line 483 being unused.

Each of the twenty-four consecutive horizontal addresses is successively strobed to the twenty-four luminance memory arrays. Thus, the first luminance memory array 130 will receive horizontal address No. 1 and then after the other twenty-three memory cards have been strobed will receive horizontal address No. 25 so that the data word assigned thereto is stored in the second horizontal slot of the array 130. Similarly, the data word corresponding to horizontal address No. 49 is stored in the third horizontal slot of the array 130, and data word assigned to horizontal address 73 in the fourth group is stored in the fourth horizontal memory slot of the array 130. Finally, the horizontal address 745 corresponds to the 32nd memory slot in the first horizontal line in the array 130. The horizontal addresses for each successive horizontal line are successively distributed to the twenty-four luminance memory cards in a similar manner, the memory slots corresponding to the 483rd horizontal line being shown in FIG. 8. It will thus be seen that each of the memory arrays 130 actually has thirty-two horizontal slots and 483 vertical memory slots to store 16, 384 data words corresponding to the illustrated segments of the composite output image consisting of one full TV frame.

Figure 6:
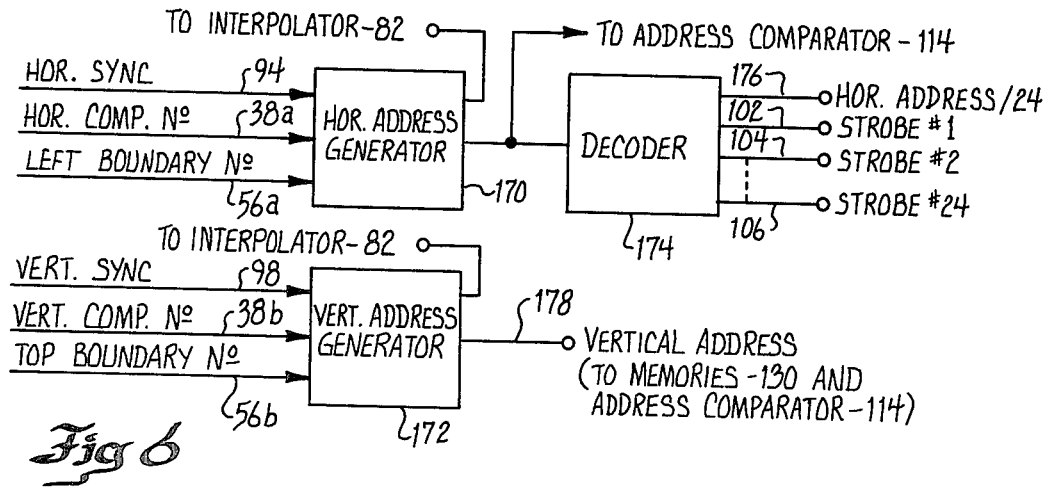
FIG. 6 is a block diagram of the address generator of the input section of FIG. 2.

Considering now in more detail the circuitry of the write address generator 96 in the input section 24, reference may be had to FIG. 6 wherein the generator 96 is shown as comprising a horizontal address generator 170 and a vertical address generator 172. As discussed generally heretofore, the horizontal address generator is controlled from the separated horizontal sync pulses appearing on the conductor 94. The generator 170 is also controlled by a horizontal compression number on the conductor 38a and the left boundary number for the input section 24 which appear on the conductor 56a. Assuming that the horizontal compression number being computed in the control section is "one" and the left boundary number corresponds to the left-hand edge of the output image, the horizontal address generator will provide consecutive horizontal addresses 1–768 starting with the horizontal sync pulse of each horizontal line of the video input signal. These horizontal addresses are supplied to a decoder 174 wherein each horizontal address is divided by twenty-four. The integer portion of the resulting quotient is supplied to the horizontal address output conductor 176 and the remainder is employed as a strobe signal which is supplied to one of the twenty-four strobe conductors, the strobe No. 1, strobe No. 2 and strobe 24 conductors 102, 104 and 106 being shown in FIG. 6. Thus, if the horizontal address 241 is generated by the generator 170 and supplied to the decoder 174, division of twenty-four results in an integer of ten and a remainder of one. The horizontal address on the conductor 176 will then comprise the number "10" and a strobe signal will be produced on the strobe No. 1 conductor 102. When a horizontal address of 242 is generated, division of this address by twenty-four provides the same integer output of ten on the horizontal address conductor 176 but the remainder of two is employed to develop a strobe No. 2 signal on the conductor 104. Thus the data word which is assigned address 241 is stored in the tenth horizontal slot of the first memory array 130, under the control of the strobe No. 1 signal on the conductor 102 and the data word which is assigned horizontal address 242 is stored in the tenth horizontal slot of the second memory array 130.

It will be recalled from the preceding general description that use of the horizontal and vertical position numbers to position a video input at any desired place on the output series may result in an address number larger than exists in the memory 20, or when subtraction of a constant is called for may result in negative addresses. Such invalid address numbers are detected by the decoder 174 which then produces no outputs for any of the strobes 102, 104, 106. There are then no outputs for the write controls 118, 120, 122 so that under either of these conditions no data will be written into memory. A similar disabling arrangement may be provided in connection with the output of the vertical address generator 172. In the alternative, the address comparator 114, in each of the input sections 22–28 may perform the function of preventing a write into memory whenever the generated write address falls outside the boundaries of the composite output image. For example, if a horizontal address of −250 is generated by the address generator 96 in the input section 22 the comparator will not supply an enabling signal to the AND gates 108, 110, 112 so that the corresponding data word is not written into the full frame memory 20. A similar arrangement would be employed in connection with vertical addresses to inhibit the output of the vertical write address generator 172.

The vertical address generator 172 is controlled from the vertical sync pulses appearing on the conductor 98 and is also controlled by a vertical compression number developed on the conductor 34b and the top boundary number for the output section 24 on the conductor 56b. Assuming that a vertical compression number of "one" is being generated and the top boundary number coincides with the top of the output image, the vertical address generator will function to develop sequentially vertical addresses 1–483 following each vertical sync pulse of the video input signal. These vertical addresses are supplied by way of the vertical address output conductor 178 to the memory arrays 130 in parallel, it being understood that the horizontal address conductor 176 and the vertical address conductor 178 collectively comprise the write address for one video input signal, such as the video No. 1 input address 100a shown in FIG. 3. The outputs of the horizontal address generator 170 and the vertical address generator 172 are also supplied to the address comparator 114 in each of the input sections 22, 24, 26 and 28, as described heretofore.

Figure 7:
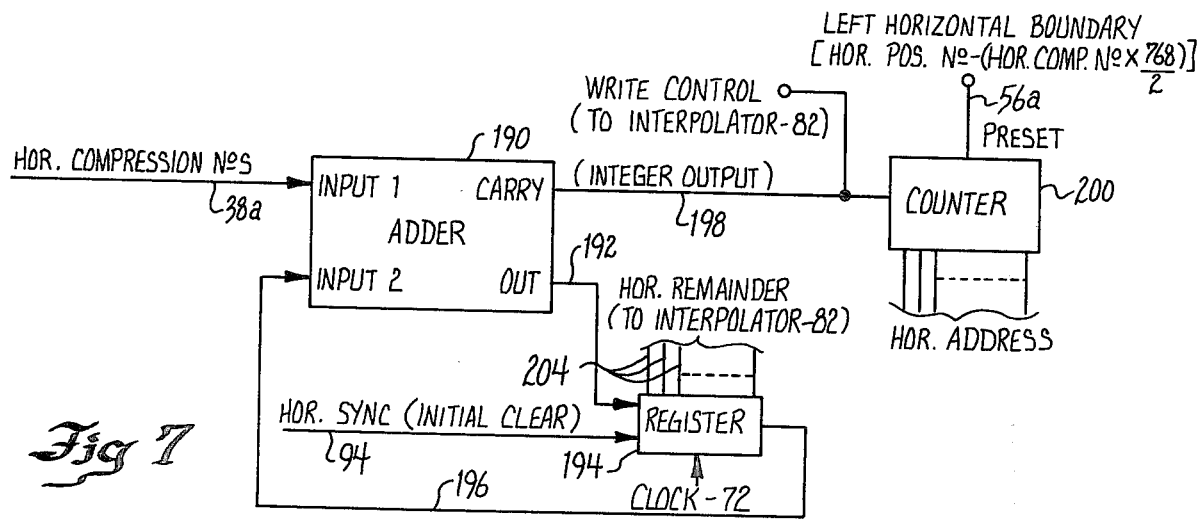
FIG. 7 is a more detailed diagram of the horizontal address generator portion of the address generator of FIG. 6.

Referring now to the details of the horizontal address generator 170, which are shown in FIG. 7, it will be recalled from the preceding general description that for a full-sized output image the horizontal addresses are started from the horizontal sync pulse on each horizontal line and are incremented by one for each picture element. If it is desired to displace the picture from center a horizontal position number is added to or subtracted from the horizontal address. Also, if it is desired to compress the size of the output image the horizontal compression number, which is a factor less than one, is incremented for each picture element, the resultant integer output being employed as the horizontal address and the fractional portion being employed in the interpolator 82 to modify the luminance data words so that they more nearly correspond to the actual value of the video signal at the compressed address.

In the preferred arrangement of FIG. 7, the horizontal compression number from the control section 30 is supplied by way of the conductor 34a to one input of a two-input adder 190. The output of the adder 190 is supplied by way of the conductor 192 to a register 194 which stores the number which is present at its input 192 each time a clock pulse from the clock pulse generator 72 is applied to the register 194. The output of the register 194 is supplied by way of the conductor 196 as the second input of the adder 190.

Initially, the register 194 is cleared to zero by the horizontal sync pulse which is supplied to this register over the conductor 94. The output of the adder 190 will then be the compression factor which appears on the conductor 34a. On the first clock pulse the compression factor is loaded into the register 194. The adder will then add the compression factor to the number present in the register, i.e. increment the compression factor, and on the next clock pulse this new number will be loaded into the register. This process continues during successive clock pulses, the adder 190 always adding the compression factor to the number in the register and on each clock pulse, which corresponds to each picture element along a horizontal line, this new number replaces the previous one in the register. Accordingly, each clock pulse increments the number in the register by the compression factor. However, the adder 190 and register 194 are arranged to hold only the fractional part of the total. At any time that the addition of the compression factor to the number in the register results in a number greater than unity a signal will appear on the carry output 198 of the adder 190. This integer output is supplied to a presettable counter 200 which functions to hold the integer portion of the developed number. The counter 200 is also arranged to be preset in accordance with the value of the left boundary for the video No. 2 input appearing on the conductor 56a. As discussed heretofore, the boundary is equal to the horizontal position number developed for video input No. 2 minus the product of the horizontal position number developed for video input No. 2 minus the product of the horizontal compression factor and one-half the picture width (768 elements). By employing the boundary number to preset the counter 200, rather than the position number alone, the effect of the compression factor on the storage of horizontal picture elements is automatically taken into account.

Considering the operation of the horizontal address generator shown in FIG. 7, when the horizontal compression number is one, the adder 190 will function to provide an integer output on the conductor 198 for each clock pulse so that the counter 200 is incremented by one for each picture element starting from the horizontal sync pulse. If the video input is to be centered in the output image, i.e. corresponding to a horizontal position number of zero, the left-hand boundary number will be preset in the counter 200 so that the first horizontal address generated at the output of the counter 200 will correspond to the left-hand edge of the output image. However, if the video input is to be offset to the right, corresponding to a horizontal position number of +200 the boundary number preset in the counter 200 will be increased by 200 so that the addresses generated by the counter 200 will start with this fixed picture offset and, for example, be incremented by one for each horizontal picture element so that the right-hand portion of the video input will be off screen in the composite output image.

Assuming that the horizontal compression number is now changed to $\frac{3}{4}$, this number is initially supplied to the input of the register 194 but is not stored in this register until the register is initially cleared by the horizontal sync pulse and a clock pulse is supplied from the Generator 72. When this occurs the number $\frac{3}{4}$ is registered in the register 194 and immediately appears in the output of this register so that the adder is provided with a second input and the sum, i.e. $1\frac{1}{2}$ is provided. The integer portion of this sum, i.e. "1" appears on the conductor 198 and the fractional portion $\frac{1}{2}$ is supplied over the conductor 192 to the register 194. Upon the second clock pulse the number $\frac{1}{2}$ is stored in the registers 194 and appears as input No. 2 of the adder 190. The sum of the two inputs is now $2\frac{1}{4}$, the integer 2 appearing on the conductor 198 and the fractional portion $\frac{1}{4}$ being supplied over the conductor 192 to the input of the register 194. The remainder numbers, such as $\frac{3}{4}$, $\frac{1}{2}$ and $\frac{1}{4}$, which are stored in the register 194 are supplied to the interpolator 82 by way of the conductors 204, wherein they are employed to modify the luminance data word in accordance with the value of the horizontal remainders for successive horizontal addresses, as will be described in more detail hereinafter.

The change in the horizontal compression factor to $\frac{3}{4}$ results in a different left boundary number being preset in the counter 200 so that the addresses generated at the output of the counter 200 start at the left-hand edge of the compressed output image. The integer output on the conductor 198 is also supplied to the interpolator 82 where it functions as a control signal to control changing of the interpolation coefficients only when there is a change in the integer output, i.e. when a new data word is written into the memory, as will be discussed in more detail hereinafter.

The vertical address generator 172 in each of the input sections 22-28 is generally similar to the horizontal address generator shown in detail in FIG. 7. However, since the memory arrays 130 each provide storage for the full series of 483 horizontal lines, it is not necessary to provide a decoder, such as the decoder 174 in connection with the output of the vertical address generator 172.

Figure 4:
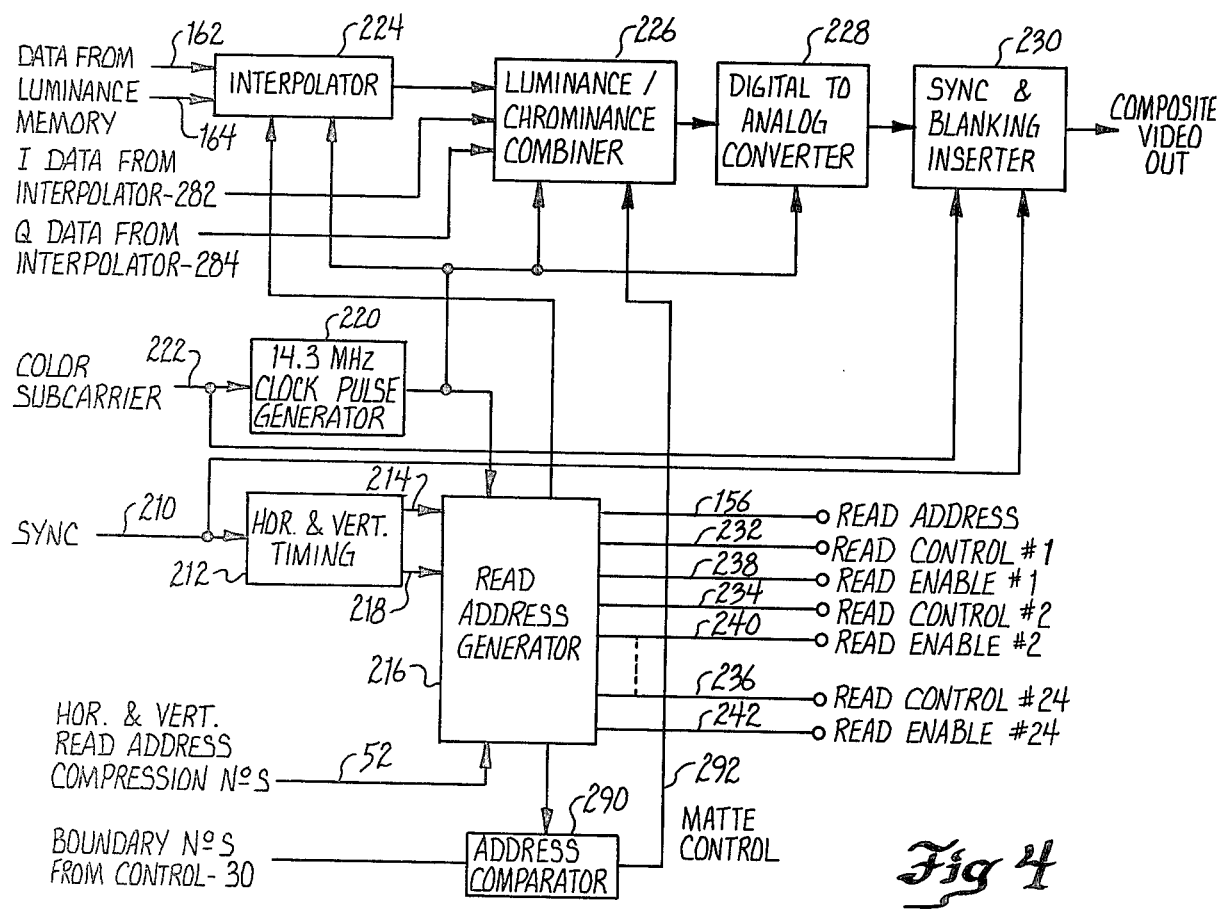
FIG. 4 is a block diagram of the output section in the system of FIG. 1.

Considering now the details of the output section 50, which is shown in FIG. 4, it will be recalled from the previous general description that the output section is employed to read out data from the common memory storage 20 at a scanning rate which may be nonsynchronous with all of the four video input signals so that the special effects generator of the present invention not only functions to provide the above-described composite video output image but also acts as a frame store synchronizer for all four of the nonsynchronously related video input signals. To this end, the read synchronizing signals, which may comprise the standard studio synchronizing generator or other source which is non-synchronous with the four video input signals, are supplied over the conductor 210 to the horizontal and vertical timing circuits 212 so that horizontal synchronizing pulses are supplied over the conductor 214 to a read address generator 216 and vertical synchronizing pulses are supplied over the conductor 218 to the generator 216. A 14.3 MHz clock pulse generator 220 is synchronized with the locally generated color subcarrier Signal supplied over the conductor 222 and provides suitable clock pulses to the read address generator so that read addresses may be generated in correspondence with the 768 picture elements stored in the common memory storage 20 for each horizontal line. The output of the clock pulse generator is also supplied to a read interpolator 224 to which the luminance data words read from the memory 20 are supplied over the conductors 162 and 164. As described generally heretofore, the interpolator 224 is employed to modify the stored luminance data values in accordance with the compressed read addresses generated by the generator 216.

The output of the interpolator 224 is supplied to a luminance-chrominance combiner 226 wherein the I and Q data words read from the memory 20 are combined with the modified luminance data output of the interpolator 224 to provide the desired composite data words corresponding to the color TV signal. The output of the combiner 226 is then supplied to a digital to analog converter 228 wherein the composite color television data words are converted to analog values. The analog video output signal is then supplied to a synchronizing pulse and blanking interval inserter 230 wherein the analog video signals is combined with suitable synchronizing and blanking pulses, and the color subcarrier, to provide the desired composite video output signal.

The read address generator 216 is generally similar to the write address generator 96 described in detail heretofore in connection with FIG. 6. However, since the position of the output image is not shifted or varied relative to the output screen, the horizontal and vertical position numbers, which are supplied to the horizontal address generator 170 and the vertical address generator 172 in the write address generator 96 are not required for the read address generator 216. This means that the counters 200 (FIG. 7) are not preset by boundary numbers and the outputs of the respective horizontal and vertical counters are used directly as the horizontal and vertical address outputs for the generators 170 and 172. The read address generator 216 develops horizontal and vertical addresses, which are similar to the outputs on the conductors 176 and 178 in FIG. 6, these outputs being collectively indicated as the read address output conductors 156 which are supplied to the registers 148 in all of the luminance and chrominance memory cards. The read address generator 216 also sequentially develops two sets of twenty-four control signals, one set being slightly delayed with respect to the other to provide sufficient time to permit data words to be read out of the memory array 130 and stored in the registers 150, 152, before these registers are connected to the common data output buses 162, 164. More particularly, the first series of twenty-four strobe signals are identified as the read control signals, three of these conductors being shown as the read control No. 1 conductor 232, the read control No. 2 conductor 234 and the read control No. 24 conductor No. 236. These read control signals correspond to the strobe No. 1–No. 24 outputs of the decoder 174 described heretofore in connection with FIG. 6. The second set of signals comprise the read enable signals of which three output conductors are shown, the read enable No. 1 conductor 238, the read enable No. 2 conductor 240 and the read enable No. 24 conductor 242. The twenty-four read control signals are supplied to the registers 148 of the twenty-four luminance cards and the twenty-four read enable signals are supplied to the registers 150, 152 in the twenty-four luminance memory cards.

The read address generator is supplied with horizontal and vertical read address compression numbers from the control section 30 by way of the conductors 52. When these horizontal and vertical compression numbers are both one, the horizontal address generator portion of the generator 216 is incremented by one for each horizontal picture element and the vertical address generator is incremented by one for each horizontal line. However, when a horizontal or vertical compression factor of less than one is supplied to the read address generator 216 compressed read addresses are generated in the manner described heretofore in connection with FIGS. 6 and 7 for the write address generator 96. When the condition occurs that no change takes place in the integer part of the generated address, which in the write computation results in a "no write condition," in the read operation no readout from the memory 20 will occur. Under these conditions the data words previously stored in the buffer register 150, 152 remain for more than one clock pulse so that the composite video output image is effectively magnified or expanded by an amount corresponding to the horizontal and vertical read address compression numbers. It will be appreciated that this magnification of the output image cannot produce greater resolution than was present in the video input signals. By employing the interpolator 224 during the read operation magnification of the original TV line structure may be avoided although the interpolation process cannot add information not originally present in the input signals. The extent to which magnification may in practice be employed is therefore limited by the resolution desired in the output image.

The interpolator 224 combines portions of the horizontal picture elements on two successive horizontal lines, which are supplied from the buffer registers 150, 152 by way of the conductors 162 and 164, in accordance with the remainder portion of the horizontal and vertical addresses developed in the read address generator 216. The interpolation process is applied to the read data in a manner similar to that employed by the interpolator 82 in connection with the write operation. However, in the case of the read address generator 216, when the computed address consists of an integer plus a fractional part F, it is required to mix a fraction F of the word addressed with a fraction (1-F) of the preceding data word. This results in the data value corresponding to a point one element of one line (in the horizontal and vertical computations) behind the computed address. This may be compensated by adding one to the address number, i.e. reading one address ahead of the desired instantaneous position in the output image.

As discussed generally heretofore it is not possible to perform the input interpolation process with the subcarrier present because the phase of the subcarrier reverses with each horizontal line. Accordingly, it is necessary to separate the chrominance data from the luminance data prior to operation on the luminance data in the input interpolator 82. Since an interpolation process is also peformed during the read operation by means of the interpolator 224 included in the output section 50, it is thus necessary to store the luminance and chrominance data separately in the memory 20 so that the luminance data may be read from the memory and interpolated before it is combined with the chrominance information in the combiner 226.

While it is necessary to store the I and Q chrominance data separately in the memory 20, it is not necessary to store as detailed information because of the restricted band width of the chrominance information under the NTSC standards. Accordingly, only six I data memory cards are employed in the common memory 20 and only three Q data memory cards are employed in the common memory 20 to provide adequate storage for the I and Q data words corresponding to one complete TV frame of the desired output image.

The manner in which the I and Q data memory cards are controlled during the write and read operations is shown in FIGS. 9 and 10. Referring first to FIG. 10 wherein I data memory card No. 1 is shown in detail, insofar as the write operation is concerned this I data memory card 270 is substantially identical to the luminance card shown in FIG. 3 with the exception that I data words from the four video input signals are sequentially supplied to the memory array 130a in place of luminance data words. Thus, considering the video No. 1 input, the I data word which is developed on the conductor 91a is supplied to the buffer register 132, the video No. 1 write address is supplied to the register 134 over the conductor 100a and the video No. 1 write control No. 1 signal is supplied over the conductor 118a to both of the registers 132 and 134, so that both the I data word and the its corresponding address are temporarily stored in the registers 132 and 134, respectively. Accordingly, in the memory array 130a I data is stored at addresses corresponding exactly to the storage of luminance data for the first luminance memory card. In a similar manner the second I data memory card 272 would be controlled in synchronism with the fifth luminance card insofar as the writing operation is concerned. In a similar manner Q data words are stored coincident with the first luminance memory card, the ninth luminance memory card, etc.

While the I and Q data words may be written into the I and Q memory cards without interpolation and in synchronism with the corresponding luminance memory cards, during the read operation it is necessary to interpolate between successive I data memory cards and successive Q data memory cards to provide more accurate I and Q data. These I and Q memory cards are controlled during the read operation as shown in FIG. 9 wherein the first nine luminance memory cards 250-266 are shown together with the 21st luminance memory card 268. The first three I data memory cards 270, 272 and 274 are also shown in FIG. 9 together with the first two Q data memory cards 276 and 278. It should be noted that in FIG. 9 all connections required to write data into the luminance and I and Q data memory cards are eliminated for purposes of simplicity.

In order to interpolate between successive I data cards, the read control No. 1 signal on the conductor 232 is supplied to the second I data memory 272 and the read control No. 21 signal is supplied to the first I data memory 270. The I data address is incremented just after the 21st luminance memory card 268 is read so that at the time the read control No. 1 signal occurs in the next strobe cycle the I data word corresponding to the first luminance card 250 is stored in the registers 280, 281 (FIG. 10) in the I data card 270 and the I data word corresponding to the fifth luminance card 258 is stored in the I data card 272. These I data words are sequentially supplied to an I data interpolator 282 and are stored therein as the respective I data cards are enabled. The interpolator 282 is controlled from the read address generator 216 so that when luminance data is read out of the first luminance memory card 250 to the interpolator 224, the I data words stored from the memory 270 corresponding to odd and even lines are supplied to the combiner 226 in the output section 50. However, when the second luminance memory card 252 is controlled by the read No. 2 signal the I data interpolator 282 functions to provide an interpolated I data word which consists of three-fourths of the value stored from the I data memory 270 and one fourth of the I data word stored from the memory 272. When the luminance memory 254 is read the I data interpolator 282 functions to provide a composite I data word consisting of one-half of the I data word from the memory 270 and one-half of the I data word from the memory 272. Similarly when the luminance memory card 256 is read the interpolator 282 provides an I data composite word consisting of three-fourths of the I data word from the memory 272 and one-fourth of the I data word from the memory 270.

When the read control No. 5 signal is employed to read data from the luminance memory 258, this signal is also supplied to the third I data memory card 274 and the I data words from read registers 280, 281 therein are stored in the interpolator 282 in place of the I data words from the I data memory 270. The I data interpolator 282 functions in a similar manner to provide an interpolated I data word for the next four picture elements during which the luminance memory cards 258-264 are sequentially read.

A similar arrangement is employed for interpolating between the Q data words stored in the two Q data memories 276 and 278. Thus, the read control No. 17 signal is employed to control the first Q data card 276 and the read control #1 signal is employed to control the second Q data card 278. A Q data interpolator 284, which is also controlled from the read address generator 216 then functions to provide an interpolated Q data word during the first eight picture elements when the luminance cards 250-264 are sequentially read. More particularly, when the luminance card 250 is read the interpolator 284 provides a Q data word to the combiner 226 which consists solely of the Q data word read from the memory 276. When the luminance memory 252 is read the Q data composite word consists of seven-eighths of the value read from the memory 276 and one-eighth of the value read from the memory 278. In a similar manner the composite Q data word is modified as the remaining luminance cards 254-264 are sequentially read so that interpolated Q data is provided to the combiner 226 during the corresponding picture elements of the composite output image.

As discussed generally heretofore, the condition can also arise in which the several video inputs are so positioned and compressed that certain addresses in the common memory 20 do not have any data written into them. To provide for this condition, the address comparator 290 (FIG. 4) is provided in the output control section 50, this comparator being supplied with the read addresses developed by the read address generator 216 and is also supplied with inputs representing the horizontal and vertical boundary numbers for each of the four video input signals, as computed in the control section 30. The address comparator 290 separately compares the generated read address and the boundaries of all four of the inputs. If the read address lies within the boundary of any input the memory 20 is read in the manner described in detail heretofore. However, if the read address lies outside the boundaries of all inputs, a control signal is supplied by way of the conductor 292 to the luminance/chrominance combiner 226. This control signal is employed to control a switch in the output of the combiner 226 so that an alternative preselected number corresponding to the desired background level is supplied to the D/A converter 228 instead of the normal output of the combiner 226. Accordingly, whenever a read address is generated that is outside the boundaries of all inputs, a video signal corresponding to black level or some predetermined background color is generated and appears in the composite output image.

Figure 5:
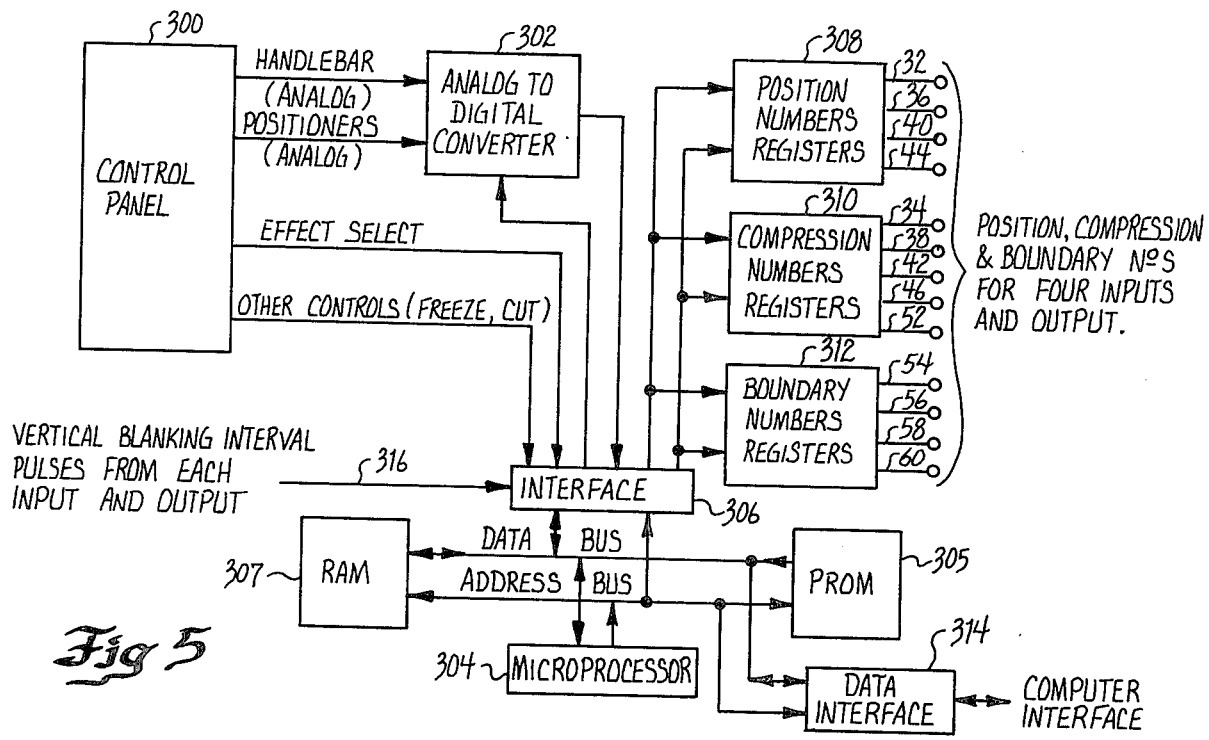
FIG. 5 is a block diagram of the control section in the system of FIG. 1.

As discussed generally heretofore, the control section 30, which is shown in detail in FIG. 5, is provided for the purpose of generating the position and compression numbers for the four video input sections 22-28, the read address compression numbers for the output section 50, and the boundary numbers for the input sections 24, 26 and 28 and the output section 50. It will be understood from the preceding description that the form of the resulting composite image is determined by the values of the position and compression numbers which are used in the address computations described in detail heretofore. These numbers may be derived from any suitable control device or devices which permit manual variation of these parameters. For example, a control panel 300 may be provided on which are provided so-called joy stick positioner devices which are movable from a central position and generate analog voltages corresponding to the vertical and horizontal components of displacement from center of each positioner. These analog voltages are then supplied to an analog to digital converter 302 wherein the instantaneous analog voltage components of each positioner in the horizontal and vertical directions are converted to a corresponding digital number. A microprocessor 304 is preferably employed to control, through the interface 306, the storage of position numbers generated by these joy stick positioners in a series of position number registers indicated generally at 308. A RAM 307 is employed to provide temporary storage of numbers computed by the microprocessor 304 at intermediate stages of computation. A PROM 305 contains the instruction numbers which are accessed by the microprocessor and control the function which it subsequently performs (for example add, subtract, input or output a number to interface). The microprocessor 304 functions to update the position numbers stored in the register 308 periodically so that as the position of each joy stick positioner is varied the corresponding horizontal and vertical position numbers registered in the registers 308 will be correspondingly varied. In a similar manner, a series of handle bar manual controls may be provided to generate analog voltages corresponding to desired horizontal and vertical compression factors for each of the four video input signals. These analog compression signals are also converted into digital signals in the analog to digital converter 302 and are stored in a series of compression number registers 310 under the control of the microprocessor 304.

The microprocess 304 also takes the digital data corresponding to the selected position numbers and the selected compression numbers for a given video input signal and computes the boundary numbers for that video input as described in detail heretofore, these numbers being stored in a series of boundary number registers 312. The horizontal and vertical boundary numbers stored in the registers 312 are supplied to the write address generators in the video input sections 22-28, to the address comparators 114 in the input sections 24, 26 and 28 to establish the above-described system of priorities, and are also supplied to the output section 50 to provide a background level of predetermined value in those areas in which no video input signal has been written into the common memory storage 20, as described in detail heretofore.

It will also be appreciated that the control panel 300 may include one or more manually variable control devices which function to vary several of the position and compression number parameters simultaneously in any of numerous preselectable combinations thereby permitting a wide range of special effects to be obtained. In the alternative the position and compression numbers, and the boundary numbers corresponding thereto may be generated by a computer external to the system which is interfaced with the microprocessor 304 through the data interface 314.

In accordance with an important aspect of the invention the position numbers, the compression numbers and the boundary numbers which are stored in the registers 308, 310 and 312 are not changed except during the vertical blanking intervals of the corresponding video input signal or the composite video output signal, so that any desired special effect may be smoothly varied from one set of control parameters to the next. To this end, the vertical blanking pulses from each video input, which may be derived for example from the horizontal and vertical timing circuit 92 in FIG. 2, and the vertical blanking pulses for the composite output signal, which may be derived from the horizontal and vertical timing circuit 212 (FIG. 4) are all supplied over the conductors 316 to the interface 306 and individually control the storage of position, compression and boundary numbers in the registers 308, 310 and 312 for the respective inputs and output so that these numbers cannot be changed except during the corresponding vertical blanking interval.

Figure 14:
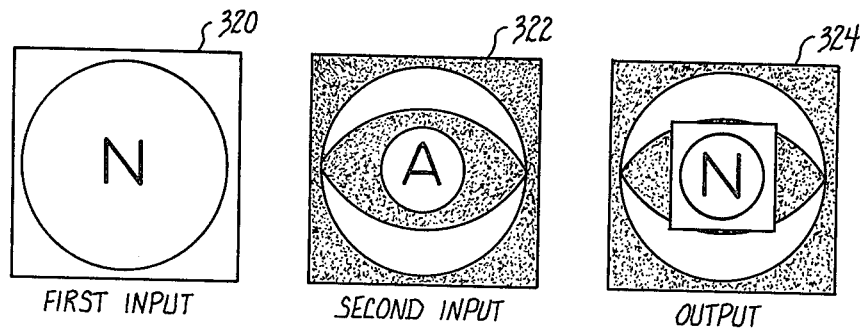

In FIG. 14 one of the special effects which is made possible by the present invention is illustrated. Referring to this figure, the first video input, which would be supplied to the highest priority input section 22 is shown as the image 320 and the second video signal, shown at 322 is applied to the second video input 24. When the first video input 320 is compressed in the horizontal and vertical directions without changing the horizontal and vertical position numbers of either image the composite image shown at 324 is provided from the output section 50. In the composite image 324, it will be noted that the image 320 has been compressed and since it is the highest priority video input occupies the central portion of the composite image 324 while the remainder of this image is composed of the remaining elements of the second video image 322 at full size.

Figure 15:
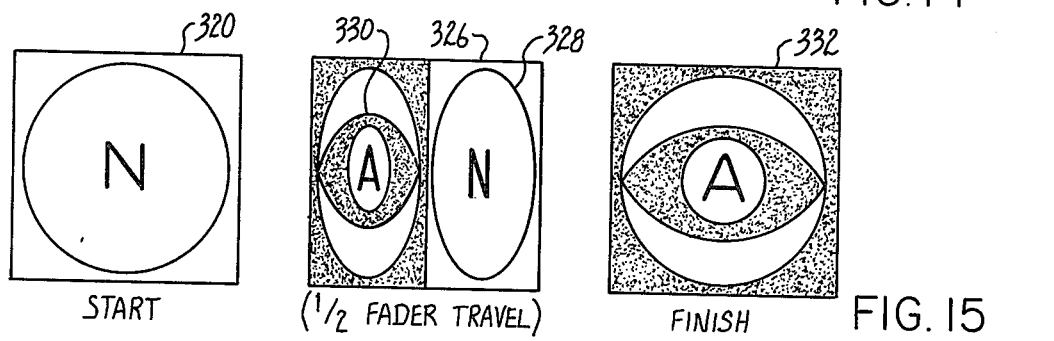

In FIGS. 15-20, inclusive, examples are given of some other special effects which are obtainable by different assignments of the output from a single fader control to the several control parameters involved. In these figures the same video input images 320 and 322 are connected to the input sections 22 and 24, except that in FIG. 21 additional video inputs are shown. Referring first to FIG. 15, the fader output is caused to reduce the horizontal compression number of the first video input section 22 and at the same time position the image to the right, while simultaneously increasing the horizontal compression number of the second video input 24 and also positioning it to the right, starting from the left-hand edge of the image. Thus, at the start of the fader movement the composite image consists only of the video input 320 since the second input 322 has been totally compressed in the horizontal direction and is positioned at the left-hand edge of the screen. At one-half fader travel the composite image 326 is provided wherein the first video image 320 has been compressed to one-half size in the horizontal direction and positioned so that it is centered in the right-hand half of the composite image 326, as indicated at 328. At the same time the second video input 322 has been expanded to one-half full size and its position moved so that it occupies the left-hand half of the composite imge 326 as indicated at 330. When full fader travel has been accomplished the composite image 332 is provided wherein the first video input 320 has been compressed completely and moved to the right-hand edge of the screen while at the same time the second video input 322 has been expanded to full size and occupies the entire composite image.

Figures 16, 17, 18:
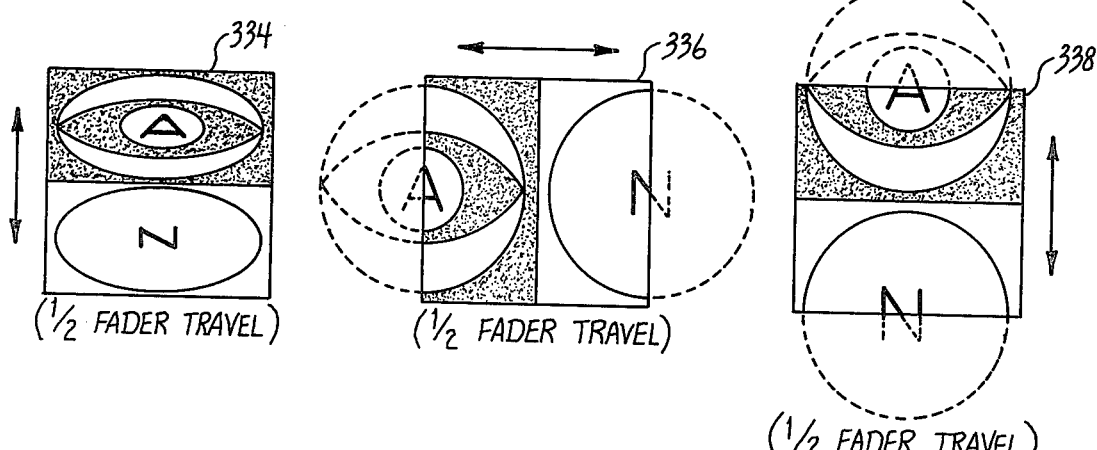

In FIG. 16 the composite image 334 is shown which is the condition at one-half fader travel when the fader is employed to effect a simultaneous control of the vertical compression and vertical position of the two inputs in a manner similar to that shown in FIG. 15 wherein the horizontal compression and position numbers are varied.

In FIG. 17 the composite image 336 is obtained at one-half fader travel when the fader is employed to effect simultaneous control of the horizontal position of the two video inputs with different starting values but without compression of either video input.

Figure 20:
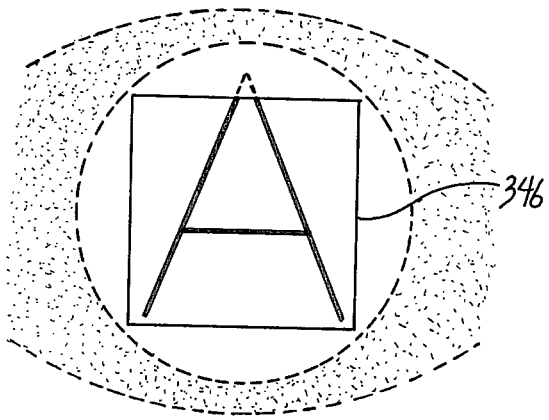

FIG. 20 shows a similar effect obtained by simultaneously controlling the vertical position numbers without compression, the composite wave form 338 being obtained at the one-half fader travel point.

Figure 19:
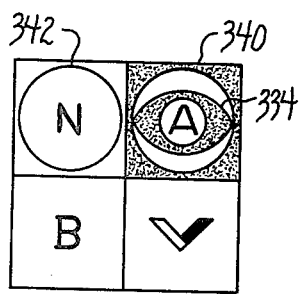

FIG. 19 shows the composite wave form 340 which is achieved in accordance with the present invention when four different video signals are applied to the input sections 22-28 and each input has a compression factor of one-half in both the horizontal and vertical dimensions and the vertical and horizontal position numbers for each input section are set so that each image occupies a different quadrant of the composite image. Thus the first video input 320 has been compressed to one-half size and positioned in the upper left-hand quadrant, as indicated at 342 and the second video input 322 has been compressed to half size and positioned in the upper right-hand quadrant as shown in 344. The other two video inputs are shown in the bottom two quadrants of the composite image 340.

In FIG. 20 the effect of manipulation upon the composite output image is shown wherein the fader is employed simultaneously to vary the horizontal and vertical compression numbers applied to the read address generator 216. In this figure the composite image 346 consists of the expanded central portion of the image 340 shown in the upper right quadrant of FIG. 19, this portion being expanded to fill the entire screen in FIG. 20.

While FIGS. 14 to 20 are given as examples of different effects which may be achieved by the arrangement of the present invention, it will be appreciated that many more different effects are possible by different combinations of the above-described control parameters.

Considering now the details of the input interpolator 82 which is included in each of the input sections 22-28, it will be recalled from the preceding general description that the interpolator 82 is required when the video input signal is to be compressed and functions to provide composite luminance data words corresponding to predetermined ratios of adjacent picture elements, as shown in FIG. 11. For example, when a compression factor of $\frac{3}{4}$ is employed this factor is incremented in the write address generator 96 and the integer portions of the output employed as the write address. When the compression factor $\frac{3}{4}$ has been incremented once the first write into memory occurs and it will be seen from FIG. 11 that the required ratios of the two succeeding data words A and B is two-thirds A and one-third B. In accordance with the present invention the interpolator 82 provides the desired composite data word by first subtracting the first data word from the second, i.e. (B minus A), then multiplying this difference by a multiplier coefficient of $\frac{1}{3}$ and adding A. This gives $\frac{1}{3}(B-A)+A$ which gives the desired $\frac{1}{3}$ B plus $\frac{2}{3}$ A.

The required multiplier coefficient of $\frac{1}{3}$ in the above formula is conveniently derived in accordance with the present invention by taking the reciprocal of the compression factor and ignoring the integer portion of this reciprocal. Thus for a compression factor of $\frac{3}{4}$ the reciprocal is 4/3 or $1\frac{1}{3}$, the remainder portion of which is the desired multiplier coefficient $\frac{1}{3}$. Furthermore, if this fractional portion of the reciprocal is incremented each time a composite data word is written into memory the desired ratio of picture elements is achieved for the entire sequence. Thus, for the second writing operation (FIG. 11) the composite data word should comprise $\frac{1}{3}$ B and $\frac{2}{3}$ C. If (C−B) is multiplied by $\frac{2}{3}$ and B is added to the product we have $\frac{2}{3}(C-B)+B$ which gives the required $\frac{2}{3}$ C+$\frac{1}{3}$ B.

On the third incrementing of the multiplier coefficient $\frac{1}{3}$ we have a coefficient of "one" which is required for the third writing into memory, as shown in FIG. 11. This sequence is then repeated as successive composite data words are written into memory. However, it will be noted that the multiplier coefficient of $\frac{1}{3}$ is incremented only when a writing into memory takes place so that there is no change in the multiplier coefficient when the addresses $3\frac{3}{4}$, $6\frac{3}{4}$, etc. are generated (FIG. 11).

Considering now the detailed circuitry of the interpolator 82 the circuit arrangement provided to generate the above-discussed horizontal and vertical multiplier coefficients is shown in FIG. 12. Referring to this figure, the horizontal and vertical compression numbers, which are generated in the control section 30 for the input section 24 are supplied over the conductors 38 to the interpolator 82, the horizontal compression number being stored in the register 350, and the vertical compression number being stored in the register 356, these registers corresponding to the compression number registers 310 shown in the control system 30 (FIG. 5) as discussed previously. In order to provide the above-described multiplier coefficient corresponding to the remainder portion of the reciprocal of the compression factor, a programmable read-only memory (PROM) 362 is provided for the horizontal compression factor and a similar PROM 366 for the vertical compression factor. The PROM 362 is programmed so that it provides the desired fractional portion of the reciprocal of the compression factor when any particular compression factor is supplied thereto from the register 350. For example, if a compression factor of ⅔ is being generated the PROM 362 provides an output of ½ as the multiplier coefficient. However, in order to avoid truncation errors, each multiplier coefficient is preferably stored as a 12-bit number in the PROM 362. The PROM 362 thus provides a table of reciprocals corresponding to a large number of compression factors ranging from zero to one so that any one so that any one of the video input signals may be smoothly compressed to a desired factor. The PROM 366 functions in a similar manner to provide a table of reciprocal remainders for a wide range of vertical compression factors. As the compression factors are thus varied the PROM's 362 and 366 function automatically to provide the required multiplier coefficients corresponding to the remainder portion of the reciprocal of each compression factor.

The output of the PROM 362 is supplied to a two input adder 370 and the output of the PROM 366 is supplied to a similar adder 378. The output of the adder 370 is supplied to a register 384, the output of this register being connected back to provide the second input of the adder 370. The adder 370 and register 384 function in a manner similar to the adder 190 and register 194 described in detail heretofore in connection with FIG. 7 to increment the reciprocal remainder stored in the PROM 362 each time a write into memory takes place. Thus, whenever the write address generator 96 develops an integer address, a signal is supplied over the conductor 198 to the register 384 so that the number stored in this register is incremented by the stored reciprocal remainder. Thus, assuming that a remainder of ⅓ is stored in the PROM 362, initially this remainder is supplied from the adder 370 to the horizontal multiplier coefficient output conductors 398. When the first write into memory takes place a signal on the conductors 198 causes the register 384 to store this output of the adder 370 so that both the inputs of the adder 370 are supplied with the reciprocal ⅓ and the horizontal coefficient on the conductors 398 now becomes ⅔. On the third writing into memory the coefficient on the conductors 398 becomes unity and this cycle is repeated as successive composite data words are written into memory.

In a similar manner the output of the two-input adder 378 is supplied to the vertical coefficient register 400, so that the desired vertical multiplier coefficient is provided on the output conductors 406. The register 400 is controlled over the conductor 392 each time a vertical write address is generated in a manner similar to that described above in connection with the generation of horizontal multiplier coefficients.

Figure 13A:
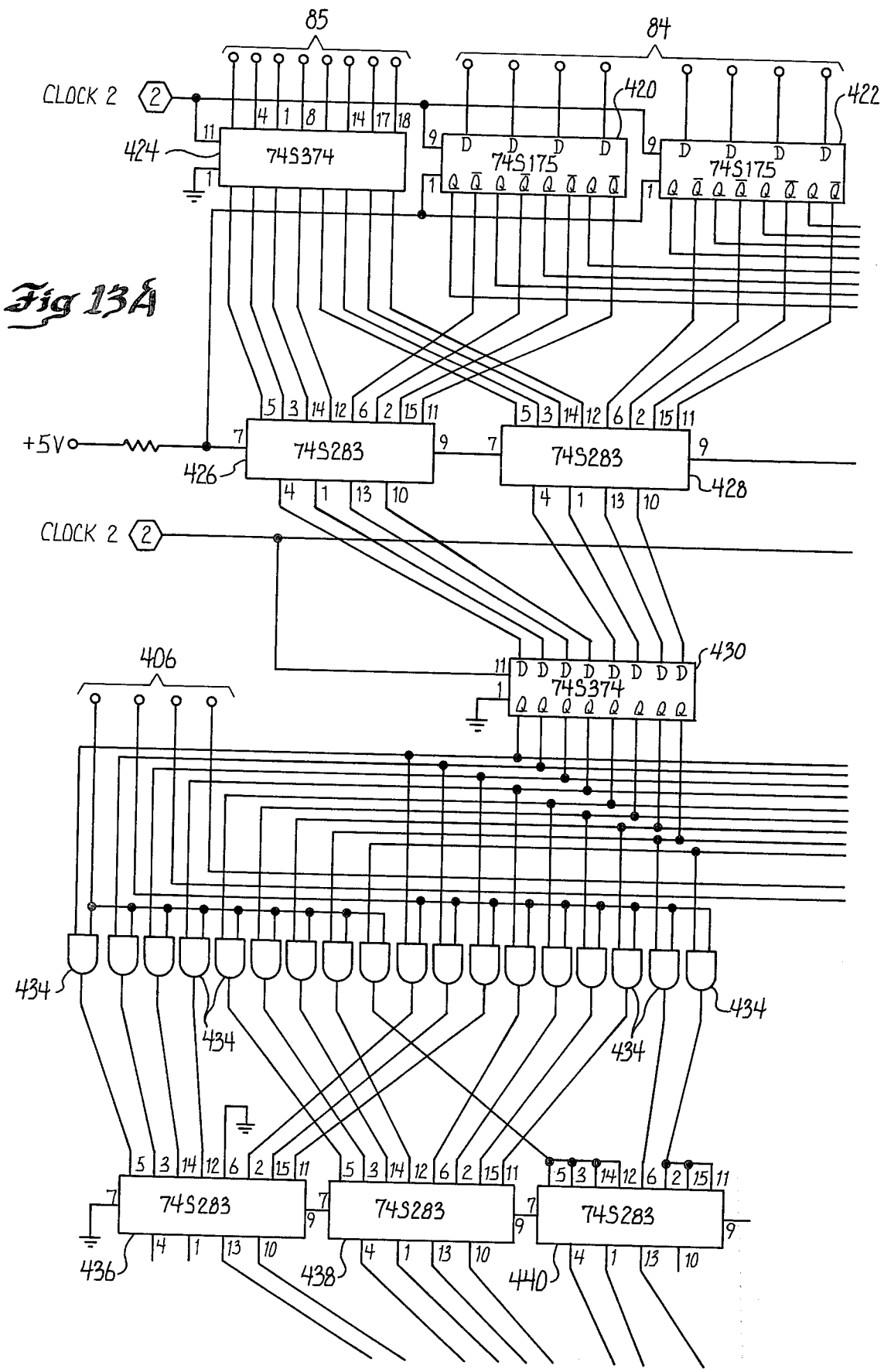
Figure 13B:
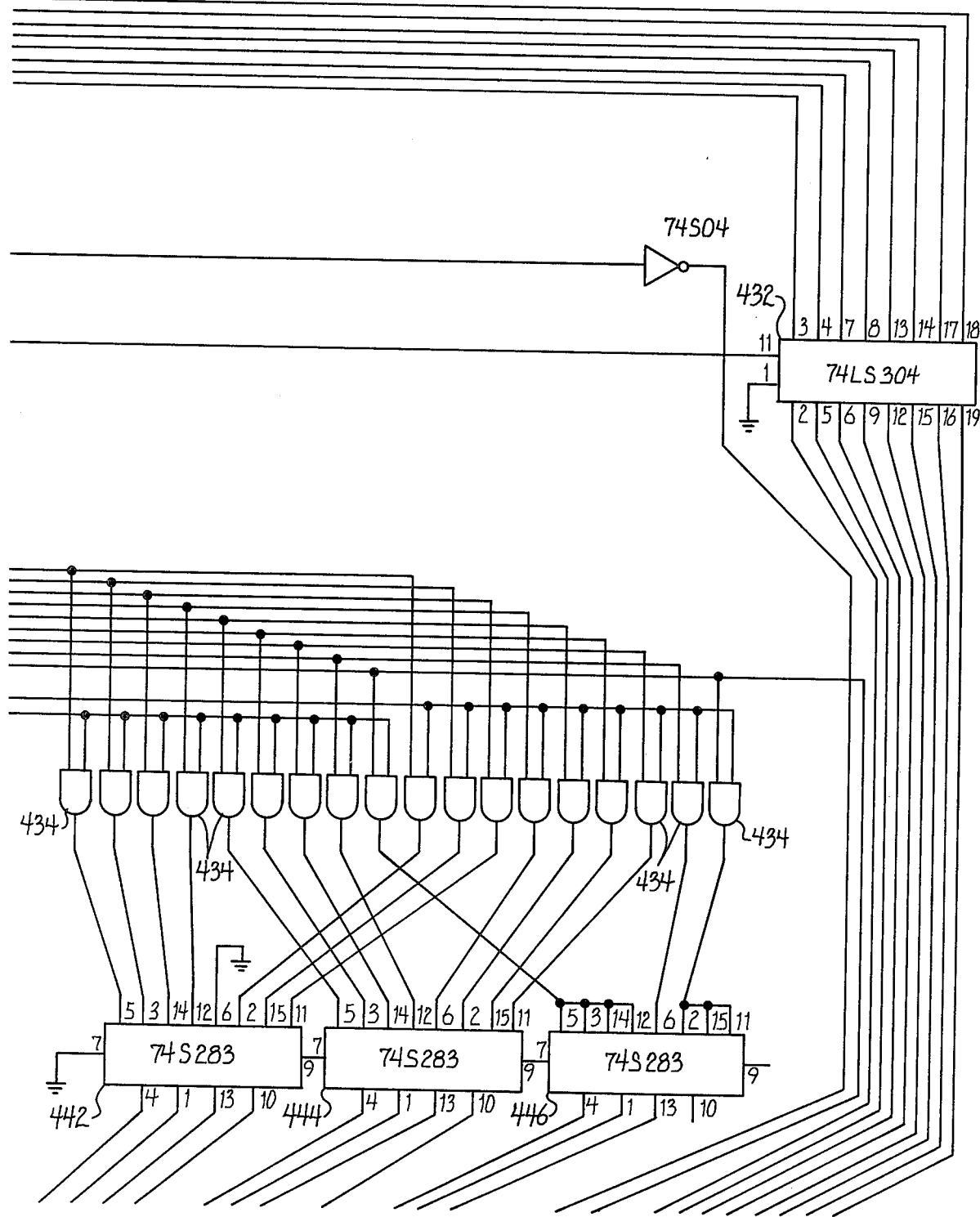

Considering now the manner in which the above-described horizontal and vertical multiplier coefficients are employed to generate the desired composite data words from adjacent horizontal picture elements of successive horizontal lines, it is pointed out that the input and output of the one line delay shift register 86 is supplied first to a vertical interpolator section, shown in FIGS. 13A, 13B, and 13C, so that data words corresponding to the same picture elements on two successive horizontal lines may be modified to provide composite data words corresponding to a desired vertical compression factor. The output of the vertical interpolator section is then supplied to a similar horizontal interpolator section (not shown) wherein the composite data words derived from the vertical interpolator section are further modified in accordance with the desired horizontal compression factor.

Considering first the vertical interpolator section, the luminance output of the separator 76 is suppled directly to the registers 420, 422 over the conductors 84 and the output of the shift register 86 is supplied to the register 424 over the input conductors 85. The registers 420, 422 and 424 are controlled from the clock generator 72 so that data words corresponding to picture elements on two successive horizontal lines are successively stored in these registers one element at a time. The adders 426, 428 are connected to the output of the registers 420, 422 and 424 so as to provide, by complementary addition, a difference signal which is stored in the register 430. Thus, assuming that the first picture element in the first horizontal line stored in the registers 420, 422 is designated A and the first horizontal picture element in the second horizontal line stored in the register 424 is designated B, the difference (B-A) is stored in the register 430. In addition, the A output of the registers 420, 422 is stored in the register 432.

The vertical multiplier coefficient is supplied over the conductors 406 to a series of AND-gates 434 to which is also supplied the (B-A) number stored in the register 430. The (B-A) number stored in the register 430 is then multiplied by the multiplier coefficient appearing on the conductors 406 in a series of levels of adders 436-446, registers 448-452 and adders 454-458 so that the desired product is registered in the register 460.

The A number stored in the register 432 is successively stored in the registers 462 and 464, which are controlled by the same clock pulses as the registers 448-452 and 460 so that the A output of the register 464 is properly timed to coincide with the output of the register 460. The outputs of the registers 460 and 464 are then combined in the adders 466 and 468 so as to provide the desired composite data word consisting of ⅔ of data word A and ⅓ of data B on the vertical interpolator output conductors 470. Accordingly, as successive data words corresponding to picture elements on the first two horizontal lines are sequentially presented to the registers 420, 422 and 424 the desired composite data words for each set of picture elements are developed on the output conductors 470. In this connection it will be understood that when the next horizontal line is scanned the vertical multiplier coefficient on the conductors 406 will change to ⅔ with appropriate changes in the values of the composite data words developed on the conductors 470.

Considering now the horizontal interpolator section of the interpolator 82, this section is generally similar to the vertical interpolator section described in detail above. More particularly, the first two composite data words developed on the output conductors 470 of the vertical interpolator section are successively stored in registers corresponding to the register 424 and the register 420, 422. The resultant difference signal (B-A) is then multiplied by the horizontal multiplier coefficient on the conductors 398 and the data word A added to the product. The resultant composite luminance data word, which has been modified in accordance with both the vertical compression factor and the horizontal compression factor, is then supplied over the conductors 88 to all of the twenty four luminance data cards in the common memory storage 20, as discussed in detail heretofore.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A video special effects generator comprising memory storage means having a plurality of addressable storage areas corresponding to different areas of a desired composite output image, first and second video signal sources, means for digitizing the picture elements of one full frame of each of said sources, means for developing addresses corresponding to storage areas of said memory storage means at which picture elements from both said sources are to appear in said desired composite output image, means controlled by said address developing means for storing said digitized elements in said memory means, and means for reading said digitized picture elements from said storage means in a predetermined sequence and developing an analog video signal corresponding thereto.

2. The video special effects generator of claim 1, which includes means for compressing the picture elements of at least one of said sources prior to storage thereof in said memory storage means.

3. The video special effects generator of claim 2, wherein said picture element compression means comprises means for developing a fractional compression factor, adder means having first and second inputs, means for supplying said compression factor to the first input of said adder means, register means for storing the output of said adder means at periodic intervals, means connecting the output of said register means to the second input of said adder means, and means controlled in accordance with the integer carry output of said adder means for compressing the picture elements of said one video signal source.

4. The video special effects generator of claim 3, wherein said storage areas are assigned predetermined address integers, and means controlled by the integer carry output of said adder means for storing said digitized picture elements in said memory storage means.

5. The video special effects generator of claim 1, which includes independently controllable picture element compression means for each of said first and second video signal sources, each of said compression means being capable of preventing predetermined picture elements of the corresponding video signal from being stored in said memory storage means.

6. The video special effects generator of claim 1, wherein said storage areas are assigned predetermined address integers, said address developing means for one of said video signal sources normally developing address integers in a predetermined sequence corresponding to successive picture elements in said one video signal, and picture element compression means for preventing said address developing means from developing an address integer during predetermined ones of said successive picture elements.

7. The video special effects generator of claim 1, wherein said storage areas are assigned predetermined address integers, said address developing means for one of said video signal sources normally developing address integers in a predetermined sequence at a predetermined uniform rate corresponding to the occurrence of successive picture elements in said one video signal, and means for varying the rate at which said address developing means develops address integers in said predetermined sequence, whereby certain picture elements in said one video signal are not stored in said memory storage means.

8. The video special effects generator of claim 1, wherein said storage areas are assigned predetermined address integers, a source of clock periods, said address developing means for one of said video signal sources normally developing address integers in a predetermined sequence at the rate of one integer per clock period which correspond to the occurrence of successive picture elements in said one video signal, and means for preventing said address developing means from developing an address integer during predetermined ones of said clock periods, whereby the picture elements which occur during said predetermined clock periods are not stored in said memory storage means.

9. In a video special effects generator, the method of combining first and second video signals to provide a desired composite output image which comprises the steps of, digitizing the picture elements of one full frame of each of said video signals, storing selected digitized picture elements from both of said video signals in predetermined storage areas of a memory, reading said stored digitized picture elements from the memory in a predetermined sequence, and developing a composite analog video signal from the digitized picture elements read out of the memory in said predetermined sequence.

10. The method of claim 9, which includes the steps of successively developing integer addresses corresponding to said predetermined storage areas of the memory, and storing said selected digitized picture elements in the memory under the control of said integer addresses.

11. In a video special effects generator, the method of compressing a video signal in accordance with a variable fractional compression factor which comprises the steps of initially applying said compression factor to one input of a fractional adder, storing the output of said adder in a register, applying the output of said register to the other input of said adder during successive timing periods corresponding to successive picture elements of said video signal, storing in a memory only those picture elements of said video signal which correspond to the integer carry pulse output of said adder, and reading the stored picture elements from the memory in a predetermined sequence.

12. The method of claim 11, which includes the steps of combining predetermined portions of certain adjacent picture elements of said video signal to provide composite picture elements, and storing said composite picture elements in said memory.

13. The method of claim 11, which includes the steps of combining portions of adjacent picture elements of said video signal in accordance with the contents of said register to provide composite picture elements, and storing said composite picture elements in said memory.

14. A video special effects generator, comprising memory storage means having storage areas corresponding to the picture elements of one complete frame of a video signal, said storage areas having addresses assigned thereto corresponding to the location of picture elements in a desired output image, first and second video input signal sources, means for digitizing the picture elements of video signals from both said first and second sources, means for storing digitized picture elements of said first video input signal in a first group of said storage areas, means for storing digitized picture elements of said second video signal in a different group of said storage areas, and means for reading said stored digitized elements from said memory in a predetermined sequence to develop a desired output image which includes picture elements from both said first and second video input signals.

15. The video special effects generator of claim 14, which includes means for altering the group of storage areas in which digitized picture elements of one of said first and second video signals are stored, thereby to alter the position of the corresponding picture elements in said output image.

16. The video special effects generator of claim 14, which includes a position control element movable through a predetermined range, means for developing a digital control signal corresponding to the position of said control element within said range, and means for controlling one of said storing means in accordance with said digital control signal, whereby the location at which the corresponding digitized picture elements appear in said output image may be varied in accordance with the position of said position control element.

17. The video special effects generator of claim 14, wherein said storing means includes address generator means for each of said first and second video input signals and each arranged to generate addresses assigned to any of said storage areas, and means for preventing digitized picture elements of said second video input signal from being stored in storage areas having addresses assigned thereto which correspond to the addresses generated by said address generator means for said first video input signal.

18. The video special effects generator of claim 14, which includes means for preventing digitized picture elements of said second video output signal from being stored in said first group of storage areas.

19. The video special effects generator of claim 17, which includes means for determining the addresses of those storage areas at which the outermost digitized picture elements of said first video input signal are stored, and means controlled by said last named means for preventing digitized picture elements of said second video input signal from being stored in the area of said output image bounded by said determined addresses.

20. The video special effects generator of claim 17, which includes means for generating a digital position offset signal, means for controlling said address generator means for said first video input signal in accordance with said position offset signal, means controlled in part by said position offset signal for determining the addresses of those storage areas at which the outermost digitized picture elements of said first video signal are stored, and means controlled by said last named means for preventing digitized picture elements of said second video signal from being stored in the area of said output image bounded by said determined addresses.

21. The video special effects generator of claim 20, wherein said position offset signal comprises a horizontal offset number, and the right and left hand boundaries of said output image area are determined by adding or subtracting said horizontal offset number from one-half the number of horizontal picture elements in said output image.

22. The video special effects generator of claim 20, wherein said position offset signal comprises a vertical offset number, and the top and bottom boundaries of said output image area are determined by adding or subtracting said vertical offset number from one-half the number of lines in said output image.

23. The video special effects generator of claim 17, which includes means for generating a digital picture compression signal, means for controlling said address generator means for said first video signal in accordance with said compression signal, means controlled in part by said compression signal for determining the addresses of those storage areas at which the outermost digitized picture elements of the compressed first video signal are stored, and means controlled by said last named means for preventing digitized picture elements of said second video signal from being stored in the area of said output image bounded by said determined addresses.

24. The video special effects generator of claim 23, wherein said compression signal comprises a horizontal fractional compression factor, and the right and left boundaries of said output image area are determined by the product of said fractional compression factor times one-half the number of horizontal picture elements in said output image.

25. The video special effects generator of claim 23, wherein said compression signal comprises a vertical fractional compression factor, and the top and bottom boundaries of said output image area are determined by the product of said fractional compression factor times one-half the number of lines in said output image.

26. A video special effects generator, comprising memory storage means having storage areas corresponding to the picture elements of one complete frame of a video signal, said storage areas having addresses assigned thereto corresponding to the location of picture elements in a desired output image, first and second video input signal sources, means for digitizing the picture elements of video signals from both said first and second sources, means for assigning addresses to digitized picture elements of said first input signal which correspond to a first group of said storage areas, means for assigning addresses to digitized picture elements of said second input signal which correspond to a second group of said storage areas, means for writing said digitized picture elements into said storage areas in accordance with the addresses assigned thereto, and means for reading said stored digitized elements from said memory in a predetermined sequence to develop a desired output image which includes picture elements from both said first and second video input signals.

27. The special effects generator of claim 26, which includes means for developing a digital position signal, means for combining said digital signal with the addresses assigned to at least some of said digitized picture elements of at least one of said input signals to provide composite address signals for such digitized picture elements, and means for storing such digitized picture elements in storage areas corresponding to said composite address signals.

28. The special effects generator of claim 26, which includes means for developing a digital position signal, and means changing the addresses assigned to at least some of said digitized picture elements of one of said input signals in accordance with said position signal, thereby to change the location of such picture elements in said output image.

29. The special effects generator of claim 28, which includes means for varying the digital value of said position signal thereby to cause a corresponding shift in the location of said picture elements in said output image.

30. A video special effects generator, comprising memory storage means having storage areas corresponding to the picture elements of one complete frame of a video signal, said storage areas having addresses assigned thereto corresponding to the location of picture elements in a desired output image, a plurality of video input signal sources having different priorities assigned thereto, means for digitizing picture elements of the video signals from each of said sources, means for storing digitized picture elements of the highest priority video signal in a first group of said storage areas, means for storing digitized picture elements of the next highest priority video signal in storage areas in which no digitized picture elements of said highest priority signal are stored, and means for reading said stored digitized elements from said memory in a predetermined sequence to develop a desired output image.

31. A video special effects generator, comprising memory storage means having storage areas corresponding to the picture elements of one complete frame of a video signal, said storage areas having addresses assigned thereto corresponding to the location of picture elements in a desired output image, a plurality of video input signal sources having different priorities assigned thereto, means for digitizing picture elements of the video signals from each of said sources, means for storing digitized picture elements of the highest priority video signal in a first group of said storage areas, means for storing digitized picture elements of lower priority video signals in storage areas in which no digitized picture element of a higher priority signal are stored, and means for reading said stored digitized elements from said memory in a predetermined sequence to develop a desired output image.

32. A video special effects generator, comprising memory storage means having storage areas corresponding to the picture elements of one complete frame of a video signal, said storage areas having addresses assigned thereto corresponding to the location of picture elements in a desired output image, a video input signal source, means for developing a data word corresponding to said picture element of said video input signal, means for developing a digital picture compression signal representing a desired factor by which the video input signal from said source is to be compressed, means for periodically increasing said compression signal by its initial value at a rate corresponding to the generation of said data words to provide a composite address signal having an integer portion and a remainder portion, means controlled in part by said remainder portions of successive composite address signals for combining portions of two successive data words to provide a composite data word, means controlled in part by successive integers of said composite address signals for storing said composite data words in storage areas corresponding to successive picture elements of said output image, and means for reading said stored composite data words from said memory in a predetermined sequence to develop said desired output image.

33. The video special effects generator of claim 32, wherein said compression signal represents a desired horizontal compression factor, means for multiplying a first horizontal data word by the product of the remainder portion of a composite address signal and the reciprocal of said horizontal compression factor to provide a first component, means for multiplying the next horizontal data word by a quantity equal to one minus said product to provide a second component, and means for adding said first and second components to provide a composite horizontal data word.

34. The video special effects generator of claim 32, wherein said combining means includes means for multiplying a first data word by F/a, where F is the remainder portion of a composite address signal and "a" is said compression factor, to provide a first component of said composite data word and means for multiplying the next data word by $(1-F/a)$ to provide a second component of said composite data word.

35. A video special effects generator, comprising memory storage means having storage areas corresponding to the picture elements of one complete frame of a video signal, said storage areas having addresses assigned thereto corresponding to the location of picture elements in a desired output image, a video input signal source, means for developing a data word corresponding to said picture element of said video input signal, means for developing a horizontal digital picture compression signal representing a desired factor by which the video input signal from said source is to be compressed in the horizontal direction, means for periodically increasing said compression signal by its initial value at a rate corresponding to the generation of said data words to provide a composite address signal having an integer portion and a remainder portion, means for developing a signal proportional to (B-A), where A and B are first and second successive horizontal data words, means for developing an interpolation coefficient equal to the remainder portion of the reciprocal of said horizontal compression signal, means for multiplying said difference signal by said interpolation coefficient to obtain a product, means for adding said first data word A to said product to provide a composite data word, and means for storing said composite data word in the storage area having an address corresponding to the integer portion of said composite address signal.

36. A video special effects generator, comprising memory storage means having storage areas corresponding to the picture elements of one complete frame of a video signal, said storage areas having addresses assigned thereto corresponding to the location of picture elements in a desired output image, a video input signal source, means for developing a data word corresponding to said picture element of said video input signal, means for developing a vertical digital picture compression signal representing a desired factor by which the video input signal from said source is to be compressed, in the vertical direction, means for periodically increasing said compression signal by its initial value at a rate corresponding to the generation of horizontal lines of said data words to provide a composite address signal having an integer portion and a remainder portion, first and second register means, means for successively storing data words corresponding to the picture elements of one horizontal line of said video input signal in said first register means and storing data words corresponding to the same picture element of the preceding horizontal line in said second register means, means for subtracting the output of said first register means from the output of said second register means, means for developing an interpolation coefficient equal to the remainder portion of the reciprocal of said vertical compression signal, means for multiplying the output of said subtracting means by said interpolation coefficient to obtain a product, and means for adding the output of said first register means to said product to provide successive composite horizontal data words, horizontal data words in storage areas having addresses corresponding to the integer portion of said composite address signal.

37. A video special effects generator comprising a plurality of separate memories each having data and address buses and each having storage areas corresponding to the picture elements of different portions of one complete frame of a video signal, said storage areas of each of said memories having addresses assigned thereto corresponding to the location of picture elements in a desired output image, a plurality of video input signals, means associated with each of said video input signals for developing a data word corresponding to each picture element of the corresponding video input signal, address generator means for each of said video input signals for assigning addresses to the data words of the corresponding video input signal according to the desired location of the corresponding picture elements in said output image, a group of data registers associated with each of said memories for temporarily storing the data words corresponding to picture elements of each of said video input signals, a group of address registers associated with each of said memories for temporarily storing the addresses assigned to the corresponding data word by said address generator means, and sequencing means associated with each of said memories for sequentially connecting the outputs of said data and address registers corresponding to different ones of said video input signals to said data and address buses of the corresponding memory.

38. The video special effects generator of claim 37, which includes read address generator means for generating the addresses of said storage areas in each of said memories in a predetermined sequence corresponding to said desired output image, read address register means associated with each of said memories for temporarily storing the read addresses developed by said read address generator means, said sequencing means associated with each of said memories also sequentially connecting the output of said read address register means to the address bus of the corresponding memory when none of said address registers are connected thereto.

39. The video special effects generator of claim 38, which includes output data register means associated with each of said memories, said sequencing means connecting said output data register means to the data bus of the corresponding memory and shifting the corresponding memory to the read made when said read address register means is connected to the address bus thereof.

40. The video special effects generator of claim 39, wherein said output data register means comprises means for temporarily and concurrently storing data words corresponding to two adjacent horizontal lines of said desired output image.

41. The video special effects generator of claim 40, which includes interpolation means connected to said output data register means for developing a composite data word comprising predetermined portions of two adjacent stored data words, and means connected to the output of said interpolation means for converting said composite data words into corresponding picture elements.

42. The video special effects generator of claim 39, which includes means connected to said output data register means for converting the data words stored therein into the corresponding picture elements of said output image.

43. The video special effects generator of claim 42, which includes means for delaying the generation of predetermined ones of said read addresses by said read address generator means, thereby to expand said output image.

44. The video special effects generator of claim 43, which includes interpolation means for developing a composite data word comprising predetermined portions of two data words stored in said output data register means, and means connected to the output of said interpolation means for converting said composite data words into corresponding picture elements.

45. A video special effects generator, comprising memory storage means having storage areas corresponding to the picture elements of one complete frame of a video signal, said storage areas having addresses assigned thereto corresponding to the location of picture elements in a desired output image, a plurality of video input signals, means associated with each of said video input signals for developing a data word corresponding to each picture element of the corresponding video input signal, means for storing data words derived from said plurality of video input signals in storage areas of said memory in accordance with the desired location of the corresponding picture elements in said output image, and means for reading said stored data words from said memory in a predetermined sequence and converting the same into corresponding picture elements of said output image.

46. The video special effects generator of claim 45, which includes read address generator means for generating read addresses corresponding to storage areas in said predetermined sequence, and means controlled by said read address generator means for supplying the data words stored in the corresponding storage areas to said picture element converting means.

47. The video special effect generator of claim 46, wherein said read addresses generated by said read address generator means are normally developed at a rate corresponding to the spacing of picture elements in a full size output image, and means for delaying the generation of predetermined ones of said read addresses by said read address generator means to expand the corresponding portion of said output image.

48. The video special effects generator of claim 47, wherein said delaying means comprises means for developing a read address compression signal, means for increasing said compression signal by its initial value at said normal rate to provide successive composite read address signals having an integer portion and a remainder portion, and means controlled by succcessive integers of said composite read address signals for supplying the data words stored in the corresponding storage areas to said picture element converting means.

49. The video special effects generator of claim 48, which includes means controlled in part by said remainder portion of successive composite read address signals for combining portions of two data words stored in said memory to provide a composite data word, and means for supplying said composite data words to said picture element converting means.

50. The video special effects generator of claim 49, wherein said compression signal represents a desired horizontal expansion factor, means for multiplying a first horizontal data word by the remainder portion of a composite read address signal to provide a first component of said composite data word, and means for multiplying the preceding data word in the same horizontal line by one minus said remainder portion to provide a second component of said composite data word.

51. The video special effects generator of claim 50, which includes means for starting said read address generator means one picture element ahead of the desired instantaneous position of the stored data word said output image.

52. The video special effects generator of claim 49, wherein said compression signal represents a desired vertical expansion factor, means for successively multiplying the data words in a first horizontal line by the remainder portions of successive composite read address signals to provide first components of said composite data words while at the same time successively multiplying the data words in the preceding horizontal line by one minus the remainder portions of successive composite read address signals to provide second components of said composite data words.

53. A video special effects generator, comprising memory storage means capable of storing data words corresponding to the picture elements in one complete TV frame, a plurality of video input signal sources, means for storing data words corresponding to picture elements of each of said video input signals in said memory, and means for reading out data words stored in said memory in a predetermined sequence to form a desired composite output image.

54. The video special effects generator of claim 53, which includes means for independently positioning the picture elements of each of said video input Signals in said output image.

55. The video special effects generator of claim 54, wherein each of said independent positioning means is capable of positioning the picture elements of the corresponding video input signal in both the horizontal and vertical directions.

56. The video special effects generator of claim 54, which includes means for independently compressing the picture elements of each of said video input signals in said output image.

57. The video special effects generator of claim 56, wherein each of said independent compressing means is capable of compressing the picture elements of the corresponding video input signal in both the horizontal and vertical directions.

58. The video special effects generator of claim 53, which includes means assigning different priorities to said plurality of video input signals, and means for causing the picture elements of only the highest priority video input signal to be stored in said memory when picture elements of two or more of said video input signals would otherwise overlap one another in said output image.

59. The video special effects generator of claim 53, which includes means for developing data words corresponding to a desired background condition of said output image in those areas in which no data words corresponding to picture elements of said video input signals are developed.

60. The video special effects generator of claim 53, wherein said plurality of video input signals are nonsynchronous with respect to each other and said desired output image.

61. The video special effects generator of claim 53, which includes means for generating position numbers corresponding to desired positions of said video input signals in said composite output image, and means controlled by said generated position number for storing said data words in said memory.

62. The video special effects generator of claim 53, which includes means for generating picture compression numbers corresponding to a desired compression of each of said video input signals, and means controlled by said compression numbers for compressing the picture elements of the corresponding video input signal and storing data words corresponding thereto in said memory.

63. The video special effects generator of claim 61, which includes means for generating picture compression numbers corresponding to a desired compression of each of said video input signals, and means controlled by both said position numbers and said compression numbers for compressing the picture elements of the corresponding video input signal and storing data words corresponding thereto in said memory.

64. The video special effects generator of claim 63, which includes means for simultaneously varying both the position numbers and the compression number corresponding to one of said video input signals.

65. A video special effects generator, comprising memory storage means capable of storing data words corresponding to the picture elements in one complete TV frame, a plurality of video input signal sources, means for storing data words corresponding to picture elements of each of said video input signals in said memory to provide a desired composite stored image, and output image expansion means for reading data words from said memory corresponding to a predetermined portion of said stored composite image at a rate such that said picture elements corresponding to said predetermined portion occupy the full TV frame of said output image.

66. A video special effects generator, comprising memory storage means capable of storing data words corresponding to the picture elements in one complete TV frame, a plurality of video input signal sources, means for storing data words corresponding to picture elements of each of said video input signals in said memory to provide a desired stored composite image, means for generating a picture expansion number corresponding to a desired expansion of a predetermined portion said stored image, and means controlled by said expansion number for controlling the rate at which stored data words corresponding to said predetermined portion of said stored composite image are read from said memory so that said predetermined portion occupies the full TV frame of said output image.

67. The video special effects generator of claim 66, which includes means for varying said picture expansion number.

68. A video special effects generator, comprising a video input signal source, means for developing data words corresponding to the picture elements of said video input signal, means for storing the luminance components of said data words in a first memory storage means, means for storing the chrominance components of said data words in a second memory storage means, and means for reading out luminance and chrominance components of data words stored in said first and second memory storage means in a predetermined sequence to form a desired output image.

69. The video special effects generator of claim 68, wherein said luminance and chrominance components corresponding to a particular data word are simultaneously read out of said first and second memory storage means.

70. The video special effects generator of claim 68, wherein said first and second memory storage means are random access memories.

71. The video special effects generator of claim 68, wherein said data words are stored in said first and second memory storage means in predetermined sequences, interpolation means for combining predetermined portions of sequentially stored luminance data words which are read from said first memory storage means to provide composite luminance data words, and means for combining said composite luminance data words and chrominance data words read from said second memory storage means to form said desired image.

72. The video special effects generator of claim 71, which includes additional interpolation means for combining predetermined portion of sequentially stored chrominance data words read from said second memory storage means to provide composite chrominance data words, and means for combining said composite luminance data words and said composite chrominance data words to form said desired image.

73. The video special effects generator of claim 68, wherein said first memory storage means is capable of storing luminance components corresponding to the picture elements in one complete TV frame.

74. The video special effects generator of claim 73, wherein said stored chrominance components correspond to only selected ones of said stored luminance components.

75. The video special effects generator of claim 74, wherein said stored chrominance components include I chrominance components corresponding only to every fourth one of said stored luminance components.

76. The video special effects generator of claim 74, wherein said stored chrominance components include Q chrominance components corresponding only to every eighth one of said stored luminance components.

77. A video special effects generator, comprising a plurality of video input signal sources, means for developing data words corresponding to the picture elements of said video input signals, means for separately storing the luminance and chrominance components of said data words, and means controlled by said stored luminance and chrominance components for forming a desired composite output image.

78. The video special effects generator of claim 77, wherein said luminance components are stored in a memory storage means capable of storing the picture elements in one complete TV frame.

79. The video special effects generator of claim 78, wherein said stored chrominance components correspond to only selected ones of said stored luminance components.

80. The video special effects generator of claim 79, wherein said stored chrominance components include I chrominance components corresponding to every fourth one of said stored luminance components.

81. The video special effects generator of claim 79, wherein said stored chrominance components include Q chrominance components corresponding to every eighth one of said stored luminance components.

82. The video special effects generator of claim 79, which includes separate memory storage means for components corresponding to the two independent chrominance variables.

83. In a video special effects generator the combination of, a video input signal source, means for separating the luminance and chrominance components of the picture elements of said video input signal and developing data words corresponding thereto, interpolation means for combining portions of said luminance data words which correspond to adjacent picture elements to provide composite luminance data words, means for storing said composite luminance data words in a first memory storage means, and means for storing said chrominance data words in a second memory storage means.

84. The combination of claim 83, wherein said first and second memory storage means are random access memories.

85. In a video special effects generator the combination of, a video input signal source, means for developing a first set of data words corresponding to the luminance components of picture elements of said video input signal, means for developing a second set of data words for the chrominance components of picture elements of said video input signal corresponding to a first independent chrominance variable, means for developing a third set of data words for the chrominance components of picture elements of said video input signal corresponding to a second independent chrominance variable, and means for separately storing said first, second and third sets of data words.

86. The combination of claim 85, which includes interpolation means for combining portions of said luminance data words which correspond to adjacent picture elements to provide composite luminance data words, and means for storing said composite luminance data words.

87. In a video special effects generator, the combination of memory storage means having data words stored therein corresponding to the picture elements of one complete frame of a desired video output image, means for developing a read address compression signal, means for increasing said compression signal by its initial value at a predetermined rate to provide successive composite read address signals having an integer portion and a remainder portion, and means controlled by successive integers of said composite read address signals for reading out stored data words from said memory storage means.

88. The combination of claim 87, which includes means controlled in part by said remainder portion of said composite read address signal for combining portions of two successively read data words to provide a composite data word.

89. The combination of claim 88, wherein said compression signal represents a desired horizontal expansion factor, means for multiplying a first horizontal data word by the remainder portion of a composite read address signal to provide a first component of said composite data word, and means for multiplying the preceding data word in the same horizontal line by one minus said remainder portion to provide a second component of said composite data word.

90. The combination of claim 89, which includes means for starting development of said composite read address signals one picture element ahead of the desired instantaneous position of the stored data word in the output image.

91. The combination of claim 88, wherein said compression signal represents a desired vertical expansion factor, means for successively multiplying the data words in a first horizontal line by the remainder portion of a composite read address signal to provide first components of said composite data words, and means for successively multiplying the data words in the preceding horizontal line by one minus said remainder portion to provide second components of said composite data words.

92. A video special effects generator comprising, a video input signal source, means for compressing in a predetermined direction the video picture corresponding to said video input signal by selectively deleting predetermined picture elements of said video input signal in said predetermined direction, said video picture compressing means including interpolation means for combining predetermined portions of adjacent picture elements to provide composite picture elements, means controlled by said composite picture elements for developing an output video image, and means including a horizontal compression control member which is movable over a predetermined horizontal picture compression range for varying the number of picture elements deleted by said picture compressing means, said horizontal picture compression member being movable to a position in which the major portion of the picture elements in each horizontal line of said video input signal are deleted so that the width of said image is reduced essentially to that of a single vertical line.

93. A video special effects generator comprising, a video input signal source, means for compressing in a predetermined direction the video picture corresponding to said video input signal by selectively deleting predetermined picture elements of said video input signal in said predetermined direction, said video picture compressing means including interpolation means for combining predetermined portions of adjacent picture elements to provide composite picture elements, means controlled by said composite picture elements for developing an output video image, and means including a vertical compression control member which is movable over a predetermined vertical picture compression range for varying the number of picture elements deleted by said picture compressing means, said vertical picture compression member being movable to a position in which the major portion of the picture elements in each vertical line of said video input signal are deleted so that the height of said video image is reduced essentially to that of a single horizontal line.

94. A video special effects generator comprising, a video input signal source, means for compressing in a predetermined direction the video picture corresponding to said video input signal by selectively deleting predetermined picture elements of said video input signal in said predetermined direction, said video picture compressing means including interpolation means for combining predetermined portions of adjacent picture elements to provide composite picture elements, means controlled by said composite picture elements for developing an output video image, means for developing a compression control number which can be varied over a predetermined range, means for varying the number of picture elements deleted in accordance with the value of said compression control number, and means for preventing variation of said compression control number except during the vertical blanking intervals of said video input signal.

95. The video special effects generator of claim 94, which includes register means for storing the value of said developed compression control number, and means operative only during the vertical blanking intervals of said video input signal for updating said register means in accordance with variations in said compression control number.

96. A video special effects generator, comprising memory storage means having addressable locations for storing data words corresponding to the picture elements in one complete TV frame, a video input signal source, means for storing data words in said memory storage means corresponding to the picture elements of said video input signal, means including read address generator means for reading said data words from said memory storage means to form a desired output image, said read address generator normally generating read addresses at a rate corresponding to the rate of occurrence of said picture elements in said video input signal, means for preventing said read address generator from generating addresses during predetermined ones of said picture elements so that only a portion of said stored data words are read from said memory storage means during a complete TV frame, register means for storing data words as they are read from said memory storage means, said register means holding the data word previously stored therein during periods when said read address generator is prevented from generating a new read address, thereby to expand the portion of said video input signal corresponding to said stored data word portion to fill said entire output image, and means for varying the rate at which said read address generator generates read addresses, thereby to vary said portion of said stored data words.

* * * * *